US011582820B2

(12) United States Patent
Gundavelli et al.

(10) Patent No.: US 11,582,820 B2
(45) Date of Patent: Feb. 14, 2023

(54) TECHNIQUES TO EXTEND A MULTIPLE ACCESS SESSION AND ACCESS TRAFFIC STEERING, SWITCHING, AND SPLITTING LOW-LAYER (ATSSS-LL) POLICIES TO AN ENTERPRISE NETWORK

(71) Applicant: Cisco Technology, Inc., San Jose, CA (US)

(72) Inventors: Srinath Gundavelli, San Jose, CA (US); Indermeet Singh Gandhi, San Jose, CA (US); Mark Grayson, Maidenhead (GB); Louis Gwyn Samuel, Swindon (GB); Oliver James Bull, Bristol (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 118 days.

(21) Appl. No.: 17/072,215

(22) Filed: Oct. 16, 2020

(65) Prior Publication Data
US 2022/0124850 A1     Apr. 21, 2022

(51) Int. Cl.
*H04W 76/15*     (2018.01)
*H04L 47/22*     (2022.01)
(Continued)

(52) U.S. Cl.
CPC ............ *H04W 76/15* (2018.02); *H04L 47/20* (2013.01); *H04L 47/22* (2013.01); *H04L 61/5014* (2022.05); *H04W 84/12* (2013.01)

(58) Field of Classification Search
None
See application file for complete search history.

(56) References Cited

U.S. PATENT DOCUMENTS 9,948,522 B2 *  4/2018  Marinelli ............ G06F 11/3058
11,178,725 B2   11/2021  Talebi Fard et al.
(Continued)

FOREIGN PATENT DOCUMENTS

WO      2019197016 A1    10/2019

OTHER PUBLICATIONS

3GPP, 3rd Generation Partnership Project; Technical Specification Group Services and System Aspects; System Architecture for the 5G System (5GS); Stage 2 (Release 16), 3GPP TS 23.501 V16.2.0, Sep. 2019, 391 pages.
(Continued)

*Primary Examiner* — Gerald A Smarth
(74) *Attorney, Agent, or Firm* — Edell, Shapiro & Finnan, LLC

(57) ABSTRACT

Presented herein are techniques to facilitate extending a multiple access Protocol Data Unit (PDU) session and Access Traffic Steering, Switching, and Splitting Low-Layer (ATSSS-LL) policies to an enterprise network. In one example, a method may include obtaining a request for an ATSSS-LL policy for a user equipment (UE) for establishing a multiple access protocol data unit session for the UE via a wireless wide area access network for an enterprise network; and providing to the UE one or more ATSSS-LL rules for the ATSSS-LL policy, an Internet Protocol (IP) address for the multiple access protocol data unit session for the UE, and an identifier for the multiple access protocol data unit session for the UE in which the IP address is utilized for a wireless local area access network connection for the UE established via a wireless local area access network of the enterprise network.

20 Claims, 8 Drawing Sheets

(51) Int. Cl.
  *H04L 47/20* (2022.01)
  *H04L 61/5014* (2022.01)
  *H04W 84/12* (2009.01)

(56) References Cited

U.S. PATENT DOCUMENTS

| | | | | |
|---|---|---|---|---|
| 11,190,989 | B2* | 11/2021 | Sirotkin | H04W 80/08 |
| 2014/0161055 | A1 | 6/2014 | Chitrapu et al. | |
| 2015/0327114 | A1 | 11/2015 | Gupta et al. | |
| 2016/0360464 | A1 | 12/2016 | Han et al. | |
| 2017/0311197 | A1 | 10/2017 | Lopes et al. | |
| 2019/0069194 | A1 | 2/2019 | Jun et al. | |
| 2019/0274178 | A1 | 9/2019 | Salkintzis et al. | |
| 2019/0306752 | A1 | 10/2019 | Lai | |
| 2019/0373505 | A1 | 12/2019 | Jun et al. | |
| 2019/0394833 | A1 | 12/2019 | Talebi Fard et al. | |
| 2021/0007166 | A1* | 1/2021 | Liao | H04W 48/16 |
| 2021/0092664 | A1 | 3/2021 | Lai et al. | |

OTHER PUBLICATIONS

3GPP, 3rd Generation Partnership Project; Technical Specification Group Core Network and Terminals; Mobile radio interface Layer 3 specification; Core network protocols; Stage 3 (Release 16), 3GPP TS 24.008 V16.2.0, Sep. 2019, 793 pages.

3GPP, 3rd Generation Partnership Project; Technical Specification Group Core Network and Terminals; Non-Access-Stratum (NAS) protocol for 5G System (5GS); Stage 3 (Release 16), 3GPP TS 24.501 V16.2.0, Sep. 2019, 611 pages.

Sharma, Vikash, "What is process of DORA in DHCP?", https://www.quora.com/What-is-process-of-DORA-in-DHCP, downloaded from the Internet Nov. 11, 2019, 3 pages.

3GPP, "3rd Generation Partnership Project; Technical Specification Group Services and System Aspects; Study on enhancement of Ultra-Reliable Low-Latency Communication (URLLC) support in the 5G Core network (5GC) (Release 16)", 3GPP TR 23.725 V16.2.0, Jun. 2019, 93 pages.

3GPP, "3rd Generation Partnership Project; Technical Specification Group Services and System Aspects; Network based IP flow mobility (Release 13)", 3GPP TR 23.861 V13.0.0, Jun. 2015, 153 pages.

V. Fuller et al., "Locator/ID Separation Protocol (LISP) Map-Server Interface", Internet Engineering Task Force (IETF), Request for Comments: 6833, Category: Experimental, ISSN: 2070-1721, Jan. 2013, 13 pages.

D. Farinacci et al., "The Locator/ID Separation Protocol (LISP)", Internet Engineering Task Force (IETF), Request for Comments: 6830, Category: Experimental, ISSN: 2070-1721, Jan. 2013, 75 pages.

R. Wakikawa et al., "IPv4 Support for Proxy Mobile IPv6", Internet Engineering Task Force (IETF), Request for Comments: 5844, Category: Standards Track, ISSN: 2070-1721, May 2010, 49 pages.

S. Gundavelli, Ed. et al., "Proxy Mobile IPv6", Network Working Group, Request for Comments: 5213, Category: Standards Track, Aug. 2008, 92 pages.

O'Hanlon, Piers et al., "WiFi-Based IMSI Catcher", Nov. 3, 2016, 22 pages.

O'Hanlon, Piers et al., "Mobile subscriber WiFi privacy", https://ieeexplore.ieee.org/document/8227304, May 2017, 10 pages.

S. Hanks et al., "Generic Routing Encapsulation (GRE)", Network Working Group, Oct. 1994, 8 pages.

ETSI, "5G; Non-Access-Stratum (NAS) protocol for 5G System (5GS); Stage 3 (3GPP TS 24.501 version 16.5.1 Release 16)", ETSI TS 124 501 V16.5.1, Aug. 2020, 729 pages.

3GPP, 3rd Generation Partnership Project; Technical Specification Group Core Network and Terminals; Mobile radio interface Layer 3 specification; Core network protocols; Stage 3 (Release 16), 3GPP TS 24.008 V16.6.0, Sep. 2020, 796 pages.

3GPP, 3rd Generation Partnership Project; Technical Specification Group Services and System Aspects; System architecture for the 5G System (5GS); Stage 2 (Release 16), 3GPP TS 23.501 V16.5.1, Aug. 2020, 440 pages.

S. Gundavelli, Ed. et al., "Flow-Binding Support for Mobile IP", Internet Engineering Task Force (IETF), ISSN: 2070-1721, Aug. 2015, 19 pages.

V. Fuller et al., "Locator/ID Separation Protocol (LISP) Map-Server Interface", Internet Engineering Task Force (IETF), ISSN: 2070-1721, Jan. 2013, 13 pages.

D. Farinacci et al., "The Locator/ID Separation Protocol (LISP)", Internet Engineering Task Force (IETF), ISSN: 2070-1721, Jan. 2013, 75 pages.

R. Wakikawa et al., "IPv4 Support for Proxy Mobile IPv6", Internet Engineering Task Force (IETF), ISSN: 2070-1721, May 2010, 49 pages.

S. Gundavelli, Ed. et al., "Proxy Mobile IPv6", Network Working Group, Aug. 2008, 92 pages.

D. Farinacci et al., "Generic Routing Encapsulation (GRE)", Network Working Group, Mar. 2000, 9 pages.

C. Perkins et al., "IP Encapsulation within IP", Network Working Group, Oct. 1996, 14 pages.

3GPP, "3rd Generation Partnership Project; Technical Specification Group Services and System Aspects; System architecture for the 5G System (5GS); Stage 2 (Release 16)," Technical Specification, 3GPP TS 23.501, V16.6.0, Sep. 2020, 447 pages.

* cited by examiner

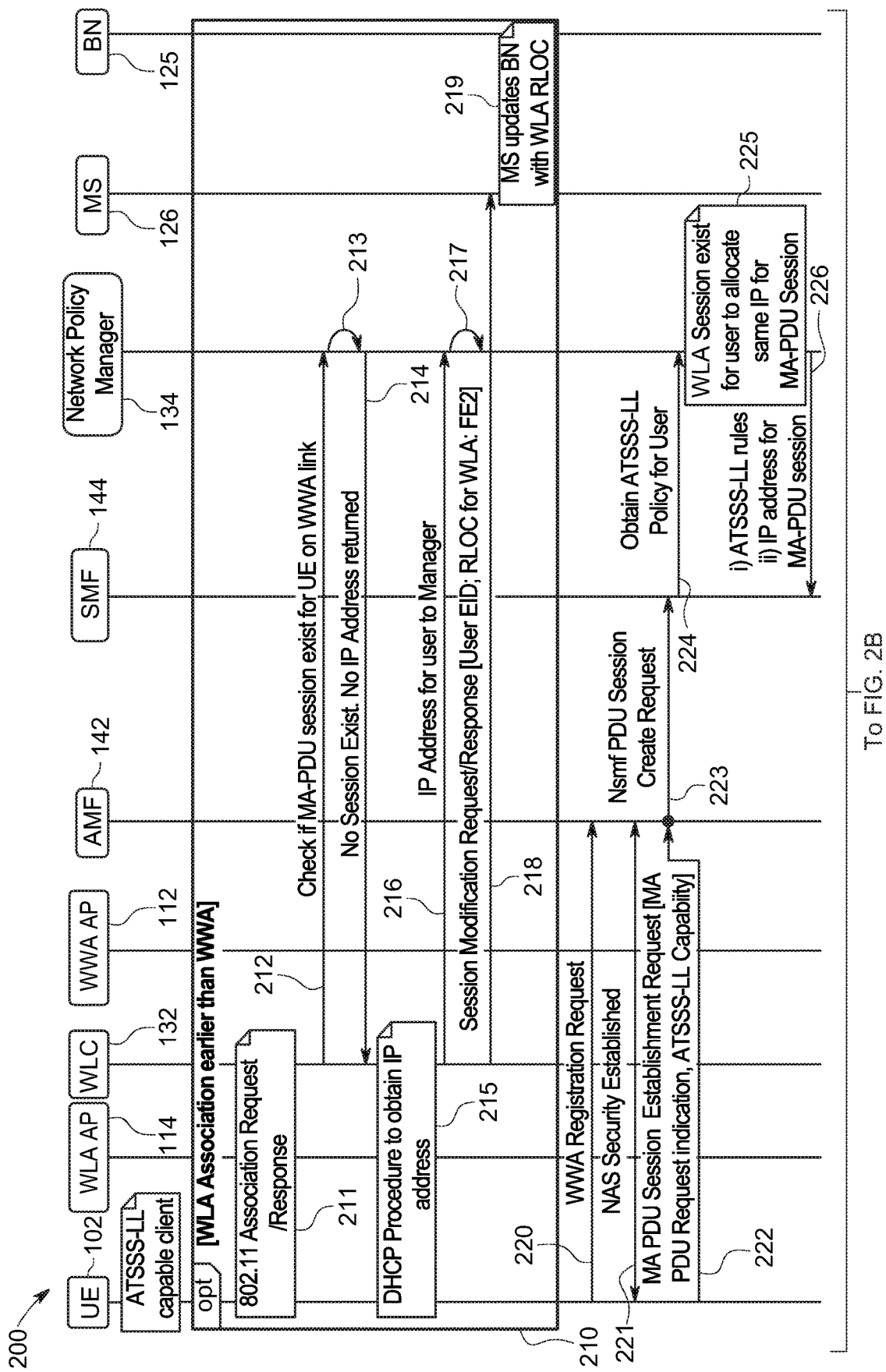

TECHNIQUES TO EXTEND A MULTIPLE ACCESS SESSION AND ACCESS TRAFFIC STEERING, SWITCHING, AND SPLITTING LOW-LAYER (ATSSS-LL) POLICIES TO AN ENTERPRISE NETWORK

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. As the number of mobile users increases, efficient management of communication resources becomes more critical. In particular, there are significant challenges in managing user equipment sessions for multiple accesses.

BRIEF DESCRIPTION OF THE DRAWINGS

FIGS. 2A, 2B, 2C, and 2D are a message sequence diagram illustrating a call flow associated with extending a multiple access PDU (MA-PDU) session and ATSSS-LL policies to an enterprise network utilizing the system of FIG. 1, according to an example embodiment.

DESCRIPTION OF EXAMPLE EMBODIMENTS

Overview

Figure 1:
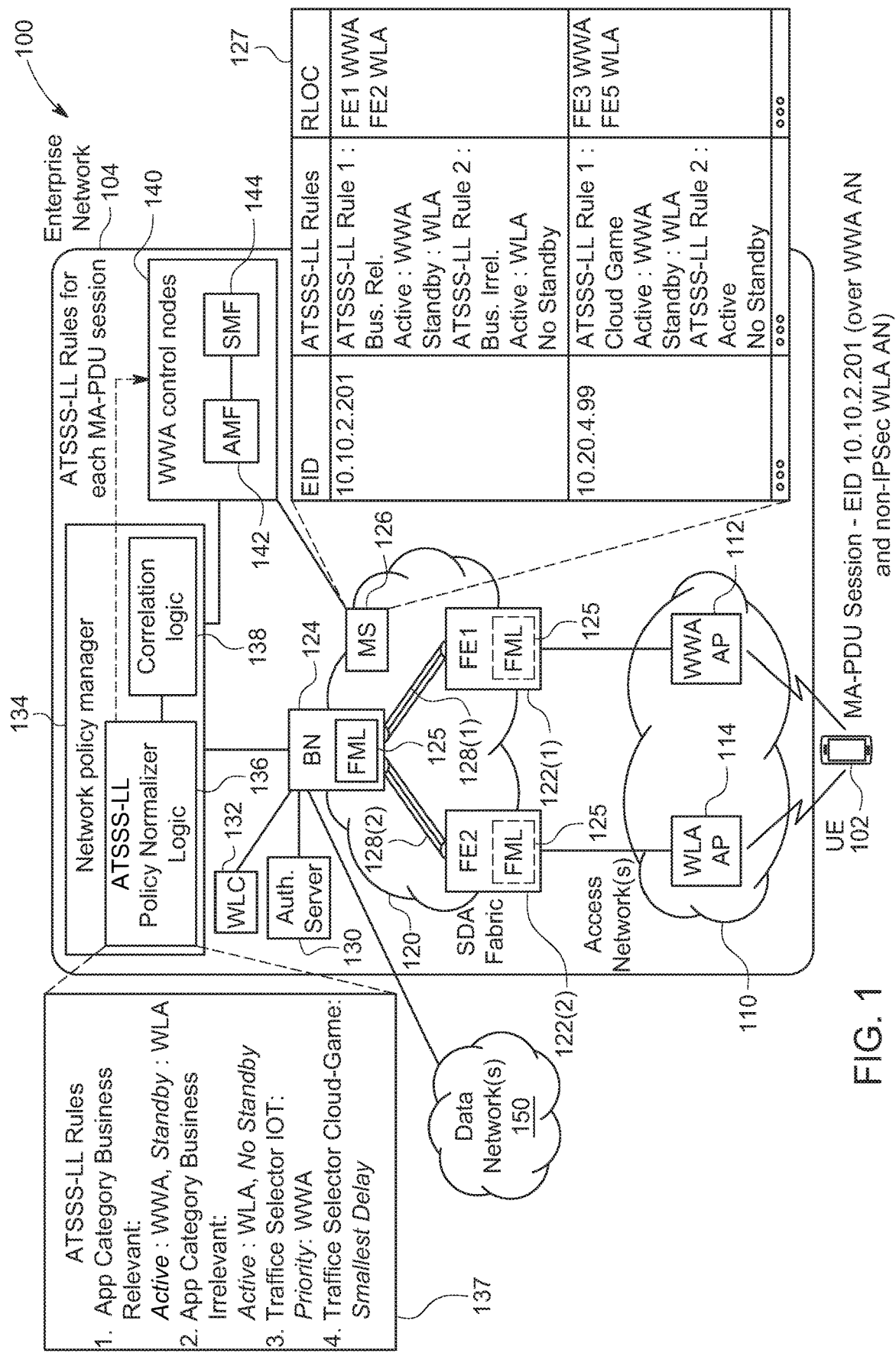
FIG. 1 is a diagram of a system in which techniques that facilitate extending a multiple access Protocol Data Unit (PDU) session and Access Traffic Steering, Switching, and Splitting Low-Layer (ATSSS-LL) policies to an enterprise network may be implemented, according to an example embodiment.

Techniques presented herein may provide for the ability to create or establish a multiple access (MA) Protocol Data Unit (PDU) session for a user equipment (UE), also referred to herein as a multi-access session, and apply one or more Access Traffic Steering, Switching, and Splitting Low-Layer (ATSSS-LL) rules for traffic for the UE for one or more service data flows (SDFs) utilizing any combination of wireless wide area (WWA) access network and wireless local area (WLA) access network connections in an enterprise fabric deployment.

In one embodiment, a method is provided, which may include obtaining a request for a ATSSS-LL policy for a user equipment (UE) for establishing a multiple access protocol data unit session for the UE via a wireless wide area access network for an enterprise network; and providing to the UE one or more ATSSS-LL rules for the ATSSS-LL policy and an Internet Protocol (IP) address for the multiple access protocol data unit session for the UE, wherein the IP address is utilized for a wireless local area access network connection for the UE established via a wireless local area access network of the enterprise network in which the enterprise network provides a common data plane for traffic of the UE for both the wireless wide area access network and the wireless local area access network. The method may further include providing the one or more ATSSS-LL rules to one or more fabric nodes of an enterprise SDA fabric. The ATSSS-LL rules may be utilized by the UE and the one or more fabric nodes in order to detect SDFs for various application traffic in order to direct the application traffic to one or more access networks for uplink and downlink communications for the UE.

EXAMPLE EMBODIMENTS

As referred to herein, an 'enterprise' or 'enterprise entity' may be considered to be a business, government, educational institution, an organization, and/or the like that may include multiple enterprise locations (or sites), such as a main campus, remote branches, and so on. Enterprise devices (e.g., enterprise user equipment (UE), etc.) that may be owned, operated, and/or otherwise associated with an enterprise may be utilized by enterprise users to serve enterprise purposes (e.g., business purpose, government purpose, educational/university purpose, etc.) of the enterprise. In some instances, an enterprise may operate an enterprise network, also referred to as an enterprise data network, which may be a network implemented to serve enterprise purposes (e.g., host enterprise applications/services/etc., perform authentications and/or authorizations, etc. for enterprise users associated with one or more UE and/or the like).

Further as referred to herein, a wireless wide area (WWA) access network, such as a cellular/Third (3rd) Generation Partnership Project (3GPP) access networks, may be characterized as a Radio Access Network (RAN) having radio nodes such as evolved Node Bs (eNBs or eNodeBs) for Fourth (4th) Generation (4G)/Long Term Evolution (LTE) access networks, next generation Node Bs (gNBs or gNodeBs) for Fifth (5th) Generation (5G) and/or next Generation (nG) access networks, and/or the like that provide a larger RAN coverage area as compared to the RAN coverages area typically provided by wireless local area (WLA) radio nodes (e.g., Institute of Electrical and Electronics Engineers (IEEE) 802.11 access points, Wi-Fi® access points, Wi-Fi6® access points, etc.). Stated differently, the WWA RAN coverage area provided by a WWA radio node is typically larger (sometimes orders of magnitude larger) than the WLA RAN coverage area provided by a WLA radio node. Additionally, a WWA RAN radio node can typically provide radio access connectivity for a larger number of devices as compared to a WLA RAN radio node. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/environment.

In some instances, an access network, such as a WWA access network, may be referred to as a private access network. By 'private' it is meant that a private WWA access network (e.g., a Citizen Broadband Radio Service (CBRS) access network and/or a 3GPP cellular (4G/LTE, 5G, nG, etc.) access network) may provide network connectivity/ services to clients (e.g., users/user equipment/devices/etc.) served by a network operator and/or service provider of the private WWA access network, such as an enterprise. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers (e.g., AT&T®, etc.), enterprises network operators/service providers (e.g., Cisco®, etc.), and/or third party network operators/service providers (e.g., neutral host network operators/service providers, cloud service providers, etc.). A private network may also be referred to as a non-public network (NPN) in some instances. Cisco is a registered trademark of Cisco Technology, Inc. AT&T is a registered trademark of AT&T Intellectual Property.

Third (3rd) Generation Partnership Project (3GPP) standards, such as 3GPP Release 16 (R16) of Technical Specification (TS) 23.501 Section 5.32.6.3.1, have defined integration architectures that provide for utilizing Access Traffic Steering, Switching, and Splitting Low-Layer (ATSSS-LL) policies between a user equipment (UE) and a networks for 3GPP access networks and non-3GPP access networks. However, these standards-based integration architectures involve the utilization of interworking functions, such as an a Non-3GPP Interworking Function (N3IWF) for untrusted access and a Trusted Non-3GPP Gateway Function (TNGF) for trusted access with Internet Protocol (IP) Security (IPsec) as the underlying transport. In general, ATSSS operates in two modes. In one of the modes, the IP addresses that are obtained for a client for a given access (e.g., WLA access and WWA access) are both used for multipath, such as with Multipath Transmission Control Protocol (MPTCP) flows in which one sub-flow utilizes a first IP address (e.g. IP-1) and another sub-flow utilizes a second IP address (e.g., IP-2). In contrast, for ATSSS-LL one common IP address (e.g., IP-3) is used and packets to IP-3 can be routed on both WLA and WWA access paths, such as for non-MPTCP flows, which may include TCP, User Datagram Protocol (UDP) and Ethernet flows.

As part of 3GPP specifications, a Multi-Access PDU (MA-PDU) session may be established between a UE and a 5G Core Network. The MA-PDU session includes two user-plane paths, each one using a different radio access network type, such as a 3GPP access and a non-3GPP access (e.g. Wi-Fi®). For the standards-based integration architectures, a MA-PDU session involves non-3GPP signaling over a non-3GPP access (e.g., Wi-Fi), such as non-3GPP Non-Access Stratum (NAS) communications/signaling over an IPSec tunnel that is to be established between the UE and the non-3GPP access network utilizing an N3IWF or TNGF.

However, enterprises deploying a private 5G core system (5GS) into an existing WLA access network core may not be able to leverage the ATSSS architecture in the current form and provide flow mobility and steering support for a UE in an enterprise network for several reasons. For example, the use of an IPsec tunnel in an enterprise network over a WLA access network is not practical as it involves an additional IPSec gateway, typically an evolved Packet Data Gateway (ePDG) or an N3IWF, which is an expensive resource for which session scaling is not easy, and adds another layer of encryption. There is already link-layer security such as with 802.1x and then there is application security such as with Transport Layer Security (TLS). With the use of an IPSec tunnel, there is one more security layer. Additionally, the deployment/implementation new interworking functions such as a TNGF and/or N3IWF typically have no/little value and make no/little sense to deploy/implement in enterprise architectures that typically involve a common transport and service core. Further, the base assumption of a centralized user plane anchor in the form of a 3GPP standards-based User Plane Function (UPF) for flow steering may be difficult to realize in a Software-Defined Access (SDA) architecture that utilizes a distributed data plane. Finally, the provision for providing the same IP address on both non-3GPP and 3GPP access, as an overlay address for mobility, can be optimized by providing just one singular address across 3GPP and non-3GPP access.

Given the above challenges, there is an opportunity to optimize enterprise architectures by eliminating some 3GPP standards-based network functions and improving the data plane performance. With such goals in mind, presented herein are techniques to create a MA-PDU session for a UE and apply ATSSS-LL policies/rules to the UE as it may be connected over a WWA access network (AN), such as a 5G-AN and also a WLA access network, such as Wi-Fi, for SDA-based enterprise fabric deployments.

Referring to FIG. 1, FIG. 1 is a diagram of a system 100 in which techniques that facilitate extending a multiple access PDU session and ATSSS-LL policies/rules to an enterprise network may be implemented, according to an example embodiment. System 100 may include a user equipment (UE) 102, an enterprise network 104, and one or more data network(s) 150 external to the enterprise network 104. Enterprise network 104 may include access networks (ANs) 110, an SDA fabric 120, an authentication (auth) server 130, a wireless LAN controller (WLC) 132, a network policy manager 134, and WWA control nodes 140.

Access networks 110 may include a WWA access network including one or more WWA radios/access points, such as WWA AP 112, and a WLA access network including one or more WLA radios/access points, such as WLA AP 114. In some embodiments, access networks 110 may also facilitate wired connectivity (e.g., Ethernet, etc.). SDA fabric 120 may include fabric edge (FE) nodes 122 (122(1) and 122(2), as shown in FIG. 1), a border node (BN) 124, and a Map-Server (MS) 126. In at least one embodiment, BN 124 may include fabric measurement logic (FML) 125; however, in other embodiments, FML 125 may be configured for any combination of FE nodes 122. In still some embodiments, FML 125 may be configured for access network APs, such as WWA AP 112 and/or WLA AP 114. Network policy manager 134 may include ATSSS-LL policy normalizer logic 136 and correlation logic 138. WWA control nodes 140 may include an Access and Mobility Management Function (AMF) 142 and a Session Management Function (SMF) 144.

In general, access networks 110 may interface with SDA fabric 120 via FE nodes 122, which may further interface with BN 124. MS 126 may further interface with FE nodes 122 and BN 124 for SDA fabric. The network elements of SDA fabric 120 may further interface in any manner with authentication server 130, WLC 132, network policy manager 134, and WWA control nodes 140.

UE 102 may be associated with any electronic device, machine, robot, etc. wishing to initiate a flow in systems discussed herein. The terms 'device', 'client device', 'client' 'electronic device', 'UE', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, a smart phone, an Internet Protocol (IP) phone, any other device and/or combination of devices, component, element, and/or object capable of initiating voice, audio, video, media, or data exchanges within system 100. UE 102 discussed herein may also be inclusive of a suitable interface to a human user such as a microphone, a display, a keyboard, or other terminal equipment. It is to be understood that any number of UEs may be present in systems discussed herein. Although not illustrated in FIG. 1, it is to be understood that enterprise UE 102 may also include any combination of hardware (e.g., communications units, receiver(s), transmitter(s), antenna(s) and/or antenna array(s), processor(s), memory element(s), baseband processor(s) (modems), etc.)], controllers, software, logic, and/or the like to facilitate any combination of over-the-air Radio Frequency (RF) WLA and/or WWA access network connections. In some instances, UE 102 may also be capable of wired interface connections.

In various embodiments, data network(s) 150 may be any combination of the Internet, an Internet Protocol (IP) Multimedia Subsystem (IMS), Ethernet network, Ethernet switching system(s), and/or the like.

In various embodiments, WWA AP 112 may be inclusive of any WWA radio device such as, CBRS radio devices (CBSDs), 5G and/or nG radio devices such as gNBs/gNodeBs, and/or the like that may facilitate over-the-air RF connections for a WWA/cellular access network (e.g., CBRS, 5G/nG, etc. access network). In various embodiments, WLA AP 114 may be inclusive of a WLA radio device, such as a Wi-Fi® access point and/or the like that may facilitate over-the-air RF connections for a WLA/Wi-Fi access network. As an access point my provide a coverage area for an access network, access networks are not shown in FIG. 1 for purposes of brevity only, however, the terms access network and access point may be referred to herein interchangeably.

Although not illustrated in FIG. 1, it is to be understood that WWA AP 112 may include any combination of hardware (e.g., communications units, receiver(s), transmitter(s), antenna(s) and/or antenna array(s), processor(s), memory element(s), baseband processor(s) (modems), etc.)], controllers, software, logic, and/or the like to facilitate over-the-air RF WWA RAN connections (e.g., 5G/nG, CBRS, etc. connections) with one or more devices (e.g., UE 102). Further, it is to be understood that WLA AP 114 may include any combination of hardware (e.g., communications units, receiver(s), transmitter(s), antenna(s) and/or antenna array (s), processor(s), memory element(s), baseband processor(s) (modems), etc.)], controllers, software, logic, and/or the like to facilitate over-the-air RF WLA RAN connections (e.g., Wi-Fi, etc. connections) with one or more devices (e.g., UE 102).

In at least one embodiment, SDA fabric 120 may represent a programmable network that provides software-based policy and segmentation from an edge of the enterprise fabric to applications/devices/nodes/etc. external to the enterprise fabric that utilizes the enterprise fabric for end-to-end connectivity. As referred to herein, the terms 'enterprise fabric', 'enterprise IP fabric', 'enterprise network fabric,' 'SDA/enterprise fabric', and variations thereof may be used interchangeably to refer to an SDA fabric, such as SDA fabric 120, which may employ SDA to facilitate end-to-end network connectivity for multiple accesses (e.g., between enterprise network 104 and UE 102, between UE 102 and data network(s) 150, etc.).

An SDA fabric, such as SDA fabric 120, may be access-agnostic and may provide end-to-end connectivity for any access type and/or combination of access types (e.g., wired, WWA/cellular, WLA/Wi-Fi®, etc.). In some instances, SDA fabric 120 may span one or more different geographic enterprise locations (or sites), such as a main campus, remote branches, and so on, each with multiple devices, services, and/or policies in order to serve enterprise purposes (e.g., business purpose, government purpose, educational/university purpose, etc.) of an enterprise entity. Accordingly, SDA fabric 120 provides an end-to-end architecture that ensures consistency in terms of connectivity, segmentation, and policy, such as ATSSS-LL policies/rules, across the different locations of an enterprise.

For SDA fabric 120, BN 124 and FE nodes 122(1)/122(2) may be implemented as switches, routers, and/or the like and may be considered Layer 2 (L2)/Layer 3 (L3) switches/routers. An edge node, such as FE node 122(1) or FE node 122(2), may be provided on an edge of the SDA fabric 120 to provide connectivity to one or more access points. For example, a first FE node 122(1) (shown in FIG. 1 and referred to herein as 'FE1' 122(1)) may facilitate interconnection between SDA fabric 120 and WWA AP 112 for enterprise network 104 and a second FE node 122(2) (shown in FIG. 1 and referred to herein as 'FE2' 122(2)) may facilitate interconnection between SDA fabric 120 and WLA AP 114 for enterprise network 104.

A border node, such as BN 124 facilitates connectivity of the SDA fabric 120 domain to external networks, such as external data network(s) 150. In various embodiments BN 124, FE1 122(1), FE2 122(2), and/or any other data plane nodes of SDA fabric 120 may operate as points of policy enforcement for SDA fabric 120 for one or more network policies, such as an ATSSS-LL policy 137 for UE 102 that may include one or more ATSSS-LL rules for routing traffic to and/or from UE 102 for one or more service data flows (SDF). That is, any of BN 124, FE1 122(1), and/or FE 122(2) may enforce ATSSS-LL policies on traffic flowing through the SDA fabric between one or more client(s) (e.g., UE 102) and one or more external network(s), element(s), application(s), etc. in order to route the traffic to and/or from the client(s) utilizing any combination of access networks 110. ATSSS-LL rules for ATSSS-LL policy 137 are discussed in further detail herein below with reference to various example operations.

In some instances, SDA fabric 120 may include an overlay network, such as a Virtual Extensible Local Area Network (VXLAN or VxLAN) overlay network in which the VXLAN overlay network may facilitate tunneling for the user plane of SDA fabric 120. Although embodiments herein provide example details associated with VXLAN, other tunneling protocols may be implemented for SDA fabric 120 including, but not limited to, Generic Routing Encapsulation (GRE) (as may be prescribed at least by Internet Engineering Task Force (IETF) Request For Comments (RFC) 1701 and 2784), IP-in-IP (as may be prescribed at least by RFC 2003), IP-in-UDP (User Datagram Protocol), among others.

In at least one embodiment, a tunneling protocol, such as VXLAN, may be implemented using Locator/ID Separation Protocol (LISP) for SDA fabric 120 to facilitate various operations as discussed herein. Generally, LISP is a control plane protocol that provides for managing network connectivity for an endpoint (e.g., UE 102). The LISP control plane can be used between forwarding plane elements (e.g., BN 124, FE1 122(1), and FE2 122(2)) and a LISP Map-Server, such as MS 126, for managing network connectivity for a client via one or more access networks 110.

Although embodiments herein provide example details associated with a LISP implementation, other control plane protocols may be implemented for SDA fabric 120 including, but not limited to, Proxy Mobile IP version 6 (IPv6), as may be prescribed at least by RFC 5213 and 5844, Identifier Locator Addressing (ILA), among others. Per a LISP architecture implementation, edge (e.g., FE1 122(1) and FE2 122(2)) and border nodes (e.g., BN 124) may be considered ingress/egress tunnel routers (TRs) that may provide ingress and egress tunnel routing operations to facilitate network communications and may be referred to as 'xTRs' (e.g., ingress/egress TRs) or proxy 'xTRs' (PxTRs) configured to provide xTR functionality (e.g., ingress/egress routing functionality).

In one instance, a first VXLAN fabric tunnel, such as VXLAN fabric tunnel 128(1) may be implemented using LISP between FE1 122(1) and BN 124 to provide data plane network connectivity across SDA fabric 120 (e.g., for forwarding WWA traffic flows to/from UE 102 across SDA fabric 120) and a second VXLAN fabric tunnel, such as VXLAN fabric tunnel 128(2) may be implemented using LISP between FE2 122(2) and BN 124 to provide data plane network connectivity across SDA fabric 120 (e.g., for forwarding WLA traffic flows to/from the UE 102 across SDA fabric 120). A full mesh of VXLAN fabric tunnels may be implemented between various BNs and FEs of an SDA fabric. For example, in some instances, a VXLAN fabric tunnel may be provided between FE1 122(1) and FE2 122(2) for forwarding traffic between UEs for enterprise network 104. Thus, SDA fabric 120 may provide a common data plane for both WLA and WWA traffic, with network elements, such as MS 126, providing mobility support for a UE, such as UE 102.

A LISP implementation, as prescribed at least by IETF RFC 6830, RFC 6833, etc. may utilize various constructs including Routing Locators (RLOCs) that may be associated with border and edge nodes (e.g., BN 124, FE1 122(1), FE2 122(2)) and endpoint identifiers (EIDs) that may be associated with/identify clients and/or other endpoints, such as UE 102, in order to facilitate network connectivity across for SDA fabric 120. In one instance, an RLOC may an IP address associated with an element in which the nomenclature 'RLOC=element' may generally represent an RLOC set to the IP address of the element. Other variations for setting an RLOC can be envisioned using, for example, Type-Length-Value (TLV) expressions, or the like. IP addresses as discussed for embodiments described herein may be implemented as IP version 4 (IPv4) and/or IP version 6 (IPv6) addresses.

For SDA fabric 120, MS 126 may be a LISP function that represents a distributed mapping database and service that accepts registration information for clients and/or other endpoint users/devices, etc. (e.g., UE 102) and stores mappings between numbering or name space constructs. For the LISP implementation of system 100, MS 126 may include MS functionality, and may store mappings, generally known as EID-to-RLOC mappings, between RLOCs for fabric nodes (e.g., FE1 122(1) and FE2 122(2)) and EIDs for clients (e.g., UE 102) for which traffic is handled or otherwise associated with the nodes. Thus, MS 126 may provide mobility support through the updating of EID-to-RLOC mappings for UEs as the UEs move between different access nodes/AP throughout system 100. In some embodiments, MS 126 may associate an EID for a client with an IP address for the client for one or more EID-to-RLOC mappings that may be managed/maintained within system 100. For example, in one instance UE 102 may be assigned an IP address '10.10.2.201', which may be the EID for UE 102 as discussed for various examples herein. Other identifiers may be utilized for a client EID. For example, in some embodiments an EID for a client/endpoint may be associated with a Media Access Control (MAC) address for the client/endpoint.

Generally as utilized herein, the nomenclature 'RLOC=FE1' refers to an RLOC identifying the IP address for FE1 122(1), which provides interconnectivity with WWA AP 112, and 'RLOC=FE2' refers to an RLOC identifying the IP address for FE2 122(2), which provides interconnectivity with WLA AP 114.

During operation, MS 126 may also communicate EID-to-RLOC mapping information to various elements of system 100 (e.g., WLC 132, network policy manager 134, WWA control nodes 140, etc.). Such information may be stored in the map-cache of the various network elements of system 100 to facilitate routing of traffic for UE 102 based on one or more ATSSS-LL rules for UE 102. Any network element may query MS 126 for the RLOC associated with a given EID. When the RLOC associated with a given EID changes, this update may be performed at MS 126.

In accordance with embodiments herein, MS 126 may be enhanced to store mapping information 127 that includes EID-to-RLOC mappings stored in association with ATSSS-LL rules for each of one or more EIDs. Mapping information 127 for MS 126 is discussed in further detail herein below with reference to various example operations.

Fabric measurement logic (FML) 125 may provide a function hosted in Fabric (e.g., BN 124 and/or a first hop edge switch, such as FE1 122(1) and/or FE2 122(2)) that measures link performance (e.g., delay, packet loss, throughput, utilization, etc.) for the WLA access network and the WWA access networks. In various embodiments, link performance may be measured by FML 125 using the 3GPP-defined performance measurement function (PMF) protocol or IP Service Level Agreement (IPSLA) functionality, as may be provided by Cisco® network elements.

Regarding other network elements of enterprise network 104, authentication server 130 may be configured to facilitate user authentication and/or subscription management for system 100. Authentication server 130 may include functionality for cellular authentication and WLA AN authentication (e.g., a Unified Data Management (UDM)/Unified Data Repository (UDR) entity/entities, Authentication, Authorization, and Accounting (AAA) entity, and/or the like). It will be appreciated that authentication server 12 may include WWA/cellular authentication and WLA/Wi-Fi authentication functionality distributed across one or more servers.

WLC 132 may provide/be responsible for WLA access network functions such as WLAN-based access authentication services, authorization services, intrusion prevention, Radio Frequency (RF) management, and/or the like to facilitate UE 102 connectivity via WLA AP 114. In some implementations, WLC 132 may be configured as an evolved WLC (eWLC).

In addition to various operations discussed for techniques herein, an AMF, such as AMF 142 may facilitate access and mobility management control/services for one or more UE, such as UE 102, to facilitate one or more over-the-air Radio Frequency (RF) connection(s) between the UE and the WWA access network provided via WWA AP 112. In addition to various operations discussed for techniques herein, an SMF, such as SMF 144, may be responsible for UE Protocol Data Unit (PDU) session management SM, with individual functions/services being supported on a per-session basis in order to facilitate data transfer(s) between a UE and one or more data network(s), such as enterprise network 104 and/or data network(s) 150.

Network policy manager 134 may represent a centralized controller for enterprise network 104 that may facilitate normalizing ATSSS-LL rules for a UE, such as UE 102, based on link performance measurements for WWA and WLA access networks in order to dynamically update, via SMF 144, one or more ATSSS-LL rules for MS 126 and UE 102. In various embodiments, network policy manager 134 may be configured with one or more databases/repositories/etc. and/or may interface with one or more external databases/repositories/etc. in order to obtain and/or be configured with ATSSS-LL policy/rule information, such as ATSSS-LL policy 137 containing various ATSSS-LL rules, for users that may be present in system 100 having MA-PDU (e.g., multi-access) session capability.

As illustrated in FIG. 1, one or more ATSSS-LL policies, such as ATSSS-LL policy 137 including one or more ATSSS-LL rules can be configured for/managed by/stored by network policy manager 134 and/or ATSSS-LL policy normalizer logic 136. In one instance, rules may be configured for applications that may be utilized by a UE based on business relevance, such as an application (app) category for business relevant applications and an application category for business irrelevant applications. In some instances, business relevant applications may include email applications, messaging/chat applications, video conferencing applications, cloud storage applications, business productivity applications, and/or the like that may be relevant to business operations for an enterprise. In some instances, business irrelevant applications may include television/video/music streaming applications, social networking applications, and/or the like that may not be relevant to business operations for an enterprise. It is to be understood that an enterprise may categorize applications as business relevant/business irrelevant in any manner. In various embodiments, ATSSS-LL rules may be stored/configured based on Data Network Name (DNN), group level policies (e.g. security group, subscription group, subscription class (bronze, gold silver), user/employee role, etc.), and/or UE/subscriber level policies.

In one instance, an ATSSS-LL rule for business relevant applications may identify an active link for business relevant application traffic as the WWA access and a standby link as the WLA access and an ATSSS-LL rule for business irrelevant applications may identify an active link for business irrelevant application traffic as the WLA access with no standby link for such traffic.

In some instances, various traffic selector rules can be configured for an ATSSS-LL policy that provide for the ability to steer traffic to an access network based on application usage. For example, a traffic selector rule can be configured for IoT traffic (e.g., based on identifying an IoT application) in which a priority is given to the WWA access for such traffic. In another example, a traffic selector rule can be configured for cloud-game traffic (e.g., based on identifying a cloud-game application) in which traffic for such an SDF may be steered to an access network having the smallest delay, which can be measured/updated based on fabric measurements. Thus, a traffic selector may be configured to identify a type of application and/or a specific application (e.g., Domain Name System (DNS) traffic based on port 53, HyperText Transfer Protocol (HTTP) traffic with port 80), based on a destination IP address (e.g., for a video streaming service), based on application identifiers, etc. Other traffic selector rules can be envisioned, for example, to steer traffic of one or more types, etc. to one or more access networks based on throughput, load, link utilization, and/or any other performance measurements/traffic characteristics that may be utilized within system 100.

During operation, network policy manager 134/ATSSS-LL policy normalizer logic 136, may obtain performance measurements from FML 125 and/or UE 102 in order to update a given ATSSS-LL rule based on network performance. For example, in reference to the 'smallest delay' rule as illustrated for ATSSS-LL policy 137, the rule could be normalized or updated during operation of system 100 (e.g., periodically, at peak usage times, etc.) in order to identify a given access network having a smallest delay such that the rule can be utilized to steer cloud-game traffic to the access network having the smallest delay. Other variations can be envisioned.

Network policy manager 134, via correlation logic 138, may also maintain user/device identifiers or, more generally, correlation information, for a given UE, such as UE 102, for multiple access in which the identifiers can be used to preserve the IP address for the UE across the multiple accesses for a MA-PDU (e.g., multi-access) session. For instance, during operation, correlation logic 138 may pre-service the IP address assigned to UE 102 on one of the access networks 110 (e.g., '10.10.2.201') and then reassign the same IP address when UE 102 accesses the other of the access networks 110. Using a single IP address for all interfaces through the enterprise network 104 may provide for the ability to improve the performance of applications accessed by UE 102 (e.g., where UE 102 accesses a common set of resources using two different access networks) via by applying ATSSS-LL rules (e.g., based on ATSSS-LL policy 137) to SDF traffic for the UE 102 in order to detect and steer traffic to/from UE using one or both of the WWA access network (WWA AP 112) and/or the WLA access network (WLA AP 114).

In various embodiments, user/device identifiers for a given UE, such as UE 102, may include any combination of a Wi-Fi/dot1x user identifier (ID) for a user associated with UE 102 (e.g., user name such as 'john', 'userA', employee identifier/number, etc.), an International Mobile Subscriber Identity (IMSI) used by UE 102 during cellular communications (e.g., '1234566664444'), MAC address of UE 102 (e.g., '00:0a:11:5b:2c:11'), an indication of the device model and/or operating system of UE 102 (e.g., 'iPhone 8 iOS 11'), an identification of a WWA AP to which the UE 102 may be attached (e.g., an AP identifier for WWA AP 112), an identification of a WLA AP to which the UE 102 may be attached (e.g., an AP identifier for WLA AP 114), an International Mobile Equipment Identity (IMEI), an IMEI Software Version (IMEISV), a Permanent Equipment Identifier (PEI), a Subscription Concealed Identifier (SUCI), a Universally Unique Identifier (UUID) and/or the like that may be stored in association with an IP address assigned to the UE 102 in order to facilitate various operations described herein.

Table 1, below, illustrates example details regarding user/device identifier correlation information that may be maintained/managed by network policy manager 134/correlation logic 138 for UE 102.

TABLE 1

USER/DEVICE CORRELATION INFORMATION

| USER ID | IMSI | MAC | DEVICE INFO | IP ADDRESS | WLA AP INFO | WWA AP INFO |
|---|---|---|---|---|---|---|
| JOHN | 1234566664444 | 00:0a:11:5b:2c:11 | Smartphone:brand:OS | 10.10.2.201 | AP114 | AP112 |

Although a Wi-Fi user ID and IMSI are discussed in this example, any suitable stable/permanent identifier may be used. A stable identifier (e.g., enterprise username, enterprise ID, Network Access Identifier (NAI) (e.g., 'userA@enterprise104.com'), user/employee role, security group tag (SGT), WLA access network ID (e.g., Service Set Identifier SSID), etc.) may be a consistent identifier for a device within a particular system, and a permanent identifier (e.g., hardware MAC address, station (STA) Serial Number (SN), etc.) may be a consistent identifier for a device across multiple systems. Furthermore, it will be appreciated that any user/device identifying information for a given UE may be known a priori or gathered dynamically during operation and stored/maintained/correlated by network policy manager 134 via correlation logic 138. It will also be appreciated that network policy manager 134 may store user/device identifying information for any suitable number of UEs. For example, user/device information for a second UE (not shown) having an IP address '10.20.4.99' and/or any number of additional UEs may also be managed by network policy manager 134/correlation logic 138.

Broadly, operations for techniques provided by system 100 may include UE 102, which is assumed to have an ATSSS-LL capability, initiating an MA-PDU session establishment request to the WWA core network/control nodes 140. Upon obtaining the request, the SMF 144 may query the network policy manager 134/correlation logic 138 to determine whether a current WLA connection exists for the UE 102 and to obtain, via ATSSS-LL policy normalizer logic 136, ATSSS-LL policies/rules for UE 102.

Correlation logic 138 may enable the same IP address to be allocated to the MA-PDU session for UE 102 on the WWA (e.g., 5G-AN) and WLA (e.g., Wi-Fi) accesses. For example, if a WLA session exists for UE 102 having an IP address '10.10.2.201', network policy manager 134, via corresponding logic, allocates the same IP address for the user and provides ATSSS-LL rules to SMF 144. The network policy manager 134 also provides an IP address for the FML 125 hosted in SDA fabric 120 to facilitate various WWA/WLA link performance measurements, as discussed herein. In various instances, the network policy manager 134 may provide information to SMF 144 via a Representational State Transfer (REST) interface, and/or any other Application Programming Interface (API).

The SMF 144 provides UE 102 the ATSSS-LL rules and the IP address or the Fully Qualified Domain Name (FQDN) for FML 125. In various embodiments, the IP address for the FML (utilizing PMF) may be provided to the UE 102 as part of 3GPP PDU session creation procedures, can be discovered by the UE 102 via a DNS query to a standard FQDN for the FML 125 (e.g., FML.enterprise.com), or may be statically configured. The SMF 144 further provides to MS 126 the UE 102 EID, the RLOC for the FE node (e.g., FE2 122(2)) interconnecting the SDA fabric 120 with the WWA access network, such as WWA AP 112 (e.g., RLOC=FE2 (IP address for FE2)), and the and the ATSSS-LL rules for UE 102. Recall, the EID for a given UE may be set to the IP address for the UE. For the UE 102 WLA access network session, once established or previously established for UE 102, WLC 132 provides the RLOC for the FE node (e.g., FE1 122(1)) interconnecting the SDA fabric 120 with the WWA access network, such as WLA AP 114 (e.g., RLOC=FE1 (IP address for FE1) for the same EID.

Thus, for the example shown in FIG. 1, the MA-PDU session for UE 102 may be identified as '10.10.2.201' over the WWA access network and the non-IPSec WLA access network.

The MS 126 may store mapping information 127, which may include EID-to-RLOC mapping information stored for a given UE in association with the ATSSS-LL rules for the UE. For example, as shown in FIG. 1, EID-to-RLOC mapping information for UE 102 includes the EID (IP address) for UE 102, stored in association with ATSSS-LL rules for the UE, which are further associated with the RLOCs for the WWA and the WLA access network FE nodes, FE1 for the WWA access network and FE2 for the WLA access network. For the present example, consider that the ATSSS-LL rules may identify business relevant and business irrelevant ATSSS-LL rules for UE 102 such that ATSSS-LL Rule 1 is associated with business relevant application traffic and ATSSS-LL Rule 2 is associated with business irrelevant application traffic. The MS 126 can distribute EID, RLOC, and ATSSS-LL rules to SDA fabric 120 nodes, such as BN 124, FE1 122(1), and FE2 122(2), which can store the mapping information in a respective map cache of each node, to facilitate routing of UE 102 traffic to appropriate access networks according the ATSSS-LL rules.

In another example, an EID-to-RLOC mapping for a second UE (not shown), having an EID (IP address) of '10.20.4.99' can be stored in association with a cloud-game rule and a streaming video rule, for WWA and WLA access network FE nodes, such as an FE3 node for the WWA and an FE5 node for the WLA. Other ATSSS-LL rules for a given UE can be envisioned.

Upon obtaining the ATSSS-LL rules, the UE 102 and the SDA fabric 120 can apply the ATSSS-LL rules on uplink (UL) and downlink (DL) in order to identify corresponding SDF traffic and route traffic for enterprise network 104 utilizing appropriate access network(s). In one example, UE 102 may apply the ATSSS-LL rules on UL traffic for sending packets to the enterprise network 104 utilizing an appropriate access network(s) and BN 124 may apply the ATSSS-LL rules on DL traffic in order to identify corresponding SDF traffic in order to encapsulate data packets over a VxLAN tunnel (e.g., 128(1) and/or 128(2) to an identified RLOC for the access network(s) that is/are to transmit the data packets to the UE. Other operations can be envisioned. For example, in some instances, traffic can between UEs can be routed between FE nodes. Further, tunnel encapsulations can be performed for UL traffic sent from an FE node toward BN 124.

In various embodiments, SDFs for different traffic may be identified based on Traffic Flow Templates (TFTs), which may utilize any combination of IP address information (e.g., source, destination address), UDP port numbers, application identifiers (e.g., in Layer 7 (L7) traffic, application instance identifiers, traffic analysis heuristics, machine learning, and/or the like.

Upon detection of WLA AN session disconnection, the FE2 122(2) RLOC entry for the WLA AP 114 connection is removed from the BN 124 map cache by the WLC 132.

Other operations may include the UE 102 and FML 125 measuring the performance of the WWA access network and the WLA access network links. In various embodiments, scheduling of measurements may be configured (e.g., by an enterprise/enterprise administrator) to be performed periodically (e.g., time/schedule based, during peak usage hours, etc.), for each WLA AP roam by a UE, for WWA AP handover, for one or more threshold(s), for one or more specific Quality of Service (QoS) levels/classes/flows, and/or the like.

UE 102 may provide (e.g., periodically) its own measurement reports to FML 125 using the IP address for the FML 125 obtained from SMF 144. In one instance, FML 125 may consolidate its measurement report(s) along with the UE's measurement report(s) and send the consolidated reports to network policy manager 134/ATSSS-LL policy normalizer logic 136. In another instance, separate reports may be sent from FML 125.

The ATSSS-LL policy normalizer logic 136 can analyze/compares the performance of the WWA access network and the WLA access network links for each user (e.g., UE 102, etc.), update/normalize ATSSS-LL rules across the users, and communicate updated ATSSS-LL rules to SMF 144 for the users. Updated ATSSS-LL rules can be sent to UE 102 over NAS PDU signaling and can be sent to SDA fabric 120, such as BN 124, FE1 122(1), and/or FE2 122(2) via updates from MS 126, which can receive the updated information from SMF 144. Release of the MA-PDU session for UE 102 results in removal of ATSSS-LL rules from UE 102 and from MS 126 by SMF 144.

Thus, network policy manager 134, via ATSSS-LL policy normalizer logic 136 and correlation logic 138, in conjunction with WLC 132 and WWA control nodes 140, as well as MS 126 may facilitate ATSSS-LL policy binding for multiple access network paths, which, for a LISP implementation, can be normalized to include RLOC/EID information in order to facilitate appropriate switching/routing across a distributed data plane, such as SDA fabric 120, using LISP forwarding elements, such as BN 124, FE1 122(1), and FE2 122(2), in which the SDA fabric 120 may provide a common data plane for both WLA and WWA traffic, with network elements, such as a Map-Server, providing mobility support for one or more UE.

Further, embodiments system 100 may facilitate reliable and/or redundant communications for a given UE, such as UE 102. For example, because each access network/AP may be anchored into the SDA fabric 120 utilizing a different fabric node, as opposed to a single node connecting multiple access network types, UE communications can be switch to a different AP and corresponding fabric node utilizing the MA-PDU techniques discussed herein.

In addition to facilitating network redundancy through multiple fabric anchors, such techniques may also be utilized to provide Ultra-Reliable Low-Latency Communication (URLLC) packet communications, Time Sensitive Network (TSN) communications, and/or the like. In some embodiments, for example, an ATSSS-LL rule could be configured to indicate that duplicate UL/DL packets are to be transmitted over two different access network connections, which may include two different RAT types or two different APs for a same RAT type (e.g., for dual connectivity capable UEs).

Consider an operational example discussed with reference to FIGS. 2A, 2B, 2C, and 2D, which are a message sequence diagram illustrating a call flow 200 associated with extending a MA-PDU session and ATSSS-LL policies to the enterprise network 104 utilizing the system 100 of FIG. 1, according to an example embodiment. FIGS. 2A-2D include UE 102, WWA AP 112, WLA AP 114, MS 126, BN 124, WLC 132, network policy manager 134, AMF 142, and SMF 144. For the embodiment of FIGS. 2A-2D, consider that FML 125 is hosted in BN 124.

Various options are illustrated for call flow 200 regarding connection of UE 102 to the WLA access network (AN), which may occur before or after UE 102 MA-PDU session establishment via the WWA AN. Operations 210 illustrate example details for a use case in which the UE 102 first connects to the WLA AN and then to the WWA AN; whereas operations 240 illustrate example details for a use case in which UE 102 first connects to the WWA access and then to the WLA access.

Consider, for example, operations at 210 in which UE 102 first connects to the WLA access network. As shown at 211 for this use case, UE 102 performs an 802.11 association request/response with WLC 132 via WLA AP 114. In at least one embodiment, the 802.11 association may include exchanges (e.g., using Extensible Authentication Protocol (EAP), variations thereof, and/or the like) with authentication server 130 to authenticate UE 102 to the WLA access network. At 212, the WLC 133 checks (queries) with network policy manager 134/correlation logic 138 to determine if a MA-PDU session exists for the UE 102 via the WWA access network (e.g., a 5G session). In various embodiments, WLC 132 may interface with network policy manager 134 using any API, via a network protocol, such as NETCONF/YANG, and/or the like.

Recall, the correlation logic 138 maintains user/device identifier information, which can include the IP address for UE 102 if the UE has an existing session via the WWA access network. In various embodiments, the WLC 132 can utilize any stable or permanent identifier obtained from the UE 102 during the association (e.g., enterprise username, NAI, MAC, station SN, etc.) at 211 in order to query network policy manager/correlation logic 138. At 213, correlation logic 138 performs a lookup using the user/device identifier obtained from WLC 132 and, in this instance, determines that no MA-PDU session exists for UE 102 (e.g., no IP address is stored for UE 102). At 214, network policy manager 134/correlation logic 138 responds to WLC 132 indicating that no MA-PDU session exists for UE 102 and no IP address for the UE 102 is returned.

Upon determining that no IP for UE 102 is returned from network policy manager 134/correlation logic 138, WLC 132 triggers a Dynamic Host Configuration Protocol (DHCP) procedure with UE 102 to obtain an IP address for UE 102, as shown at 215. In some instances, WLC 132 may include a DHCP server, however, in other instances the DHCP procedure may be performed additionally with an external DHCP server (not shown) for enterprise network 104. For the present example, consider that UE 102 is assigned an IPv4 IP address of '10.10.2.201'. It is to be understood that IP addresses discussed for techniques herein can utilize and IPv4/IPv6 IP addresses.

Upon obtaining the IP address for UE 102, at 216, WLC 132 notifies network policy manager 134/correlation logic 138 of the IP address assigned to UE 102. At 217, correlation logic 138 updates the user/device information maintained for UE 102 with the IP address. At 218, WLC 132 further notifies MS 126 regarding the EID for UE 102 (the UE 102 IP address) and the RLOC of the FE node to which WLA AP 114 is connected, RLOC=FE2 for this example (e.g., the IP address for FE2 122(2)), which triggers MS 126 to update EID-to-RLOC mapping information for UE 102 (e.g., as shown via mapping information 127). At 219, MS 126 updates the map-cache of BN 124 with the EID and RLOC information regarding the UE 102 WLA AN connection (e.g., RLOC=FE2). Thus, techniques as provided herein may facilitate native use of the WLA AN without an overlay IPSec tunnel.

Although not illustrated in FIG. 2A, MS 126 may also update the map-cache of FE1 122(1) with the EID and RLOC information regarding the UE 102 WLA AN connection, for example, to facilitate intra-fabric communications between UE 102 and one or more other UE that may be connected to the WWA AN via WWA AP 112.

Consider at 220 that UE 102 initiates a WWA (e.g., 5G/nG) registration request to AMF 142 via WWA AP 112 for the WWA AN. At 221, AMF 142 and UE 102 perform 3GPP standards-based exchanges to establish NAS communications for UE 102. Upon establishing NAS communications, UE 102 transmits a MA-PDU session establishment request to AMF 142 that includes an MA-PDU request indication and an indication that UE 102 is capable of ATSSS-LL functionality/communications, as shown at 222. In various embodiments, the MA-PDU request indication the ATSSS-LL capability indication can be carried in one or more information elements (IEs), as bits, flags, and/or the like in a MA-PDU session establishment request.

Obtaining the MA-PDU session establishment request may trigger AMF 142, at 223, to communicate an Nsmf PDU session create request to SMF 144 for UE 102 via a standards-based Nsmf service-based interface (SBI) communication, which may trigger SMF 144, at 224, to query network policy manager 134 to obtain the ATSSS-LL policy/rules for UE 102 using any stable/permanent identifier obtained from UE 102 that can be included by AMF 142 in the session create request sent to SMF 144. For example, the identifier may be an identity used by the UE for authentication, can be a correlated identity that the authentication server 130 provides as part of an access authentication, and/or the like. For example, in one instance, the AMF 142 and/or SMF 144 may interact with the authentication server 130, which may provide a correlation between an IMSI for the UE with an enterprise ID for the user/UE (e.g., userA@enterprise.com).

At 225, network policy manager 134 via correlation logic 138 checks, using the stable/permanent identifier obtained from SMF 144 to determine whether a current WLA AN session exists for UE 102. Consider for this example that, based on operations 210 discussed above that a current WLA AN session does exist for UE 102; thus, network policy manager 134 allocates the same IP address for UE 102 ('10.10.2.201') currently in use for the WLA AN session to the MA-PDU session for UE 102. If there were no current WLA AN session for UE 102, network policy manager 134 could allocate an IP address to UE 102 for the MA-PDU session, which would be stored by correlation logic 138 along with other user/device identifiers maintained for UE 102.

Further at 225, network policy manager 134 via ATSSS-LL policy normalizer logic 136 obtains the ATSSS-LL rules for UE 102 using the stable/permanent identifier for UE 102 obtained from SMF 144. As noted above, ATSSS-LL rules can be configured/stored based on DNN, group level policies (e.g. security group, subscription group, subscription class (bronze, gold silver), user/employee role, etc.), and/or UE/subscriber level policies.

Figure 2B:
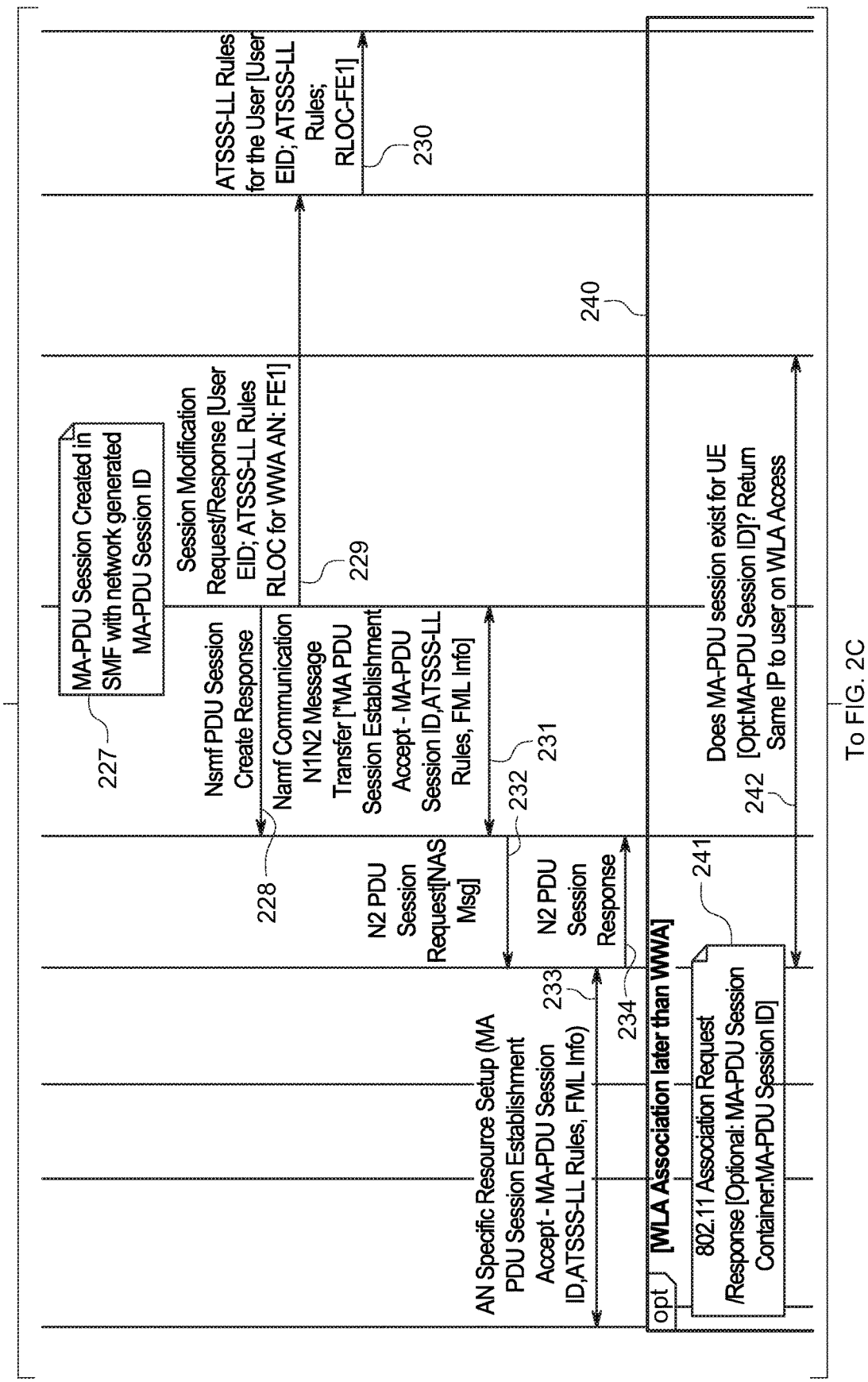

Continuing to FIG. 2B, at 226, network policy manager 134 returns the ATSSS-LL rules for UE 102 and the IP address for the MA-PDU session for UE 102 (e.g., '10.10.2.201' in this example) to SMF 144.

At 227, the MA-PDU session for UE 102 is created in the SMF 144 via standards-based procedures using a network generated MA-PDU session identifier (ID) generated by the SMF 144 for the UE 102 MA-PDU session. In various embodiments, a MA-PDU session identifier may be any multi-bit/byte unique identifier that can be generated and stored to identify MA-PDU sessions for multiple UEs.

At 228, SMF 144 communicates an Nsmf PDU session create response to AMF 142, which triggers an Namf communication N1N2 message transfer exchange between AMF 142 and SMF 144 at 231 in which SMF 144 communicates an MA-PDU session establishment accept to AMF 142 that includes the IP address for UE 102, the MA-PDU session ID, the ATSSS-LL rules for UE 102, and FML 125 identifying information, such as the IP address or FQDN for FML 125.

At 229, SMF 144 may also communicate a LISP session modification request/response to MS 126 that includes the UE 102 EID (e.g., the same IP address '10.10.2.201' that is utilized for the WWA AN MA-PDU session), the ATSSS-LL rules for UE 102, and the RLOC of the FE node to which WWA AP 112 is connected, RLOC=FE1 for this example (e.g., the IP address for FE1 122(1)), which triggers MS 126 to update EID-to-RLOC mapping information for UE 102 (e.g., as shown via mapping information 127). At 230, MS 126 updates the map-cache of BN 124 to include ATSSS-LL rules and RLOC information regarding the WWA AN connection (e.g., RLOC=FE1) for the UE 102 EID.

Figure 2C:
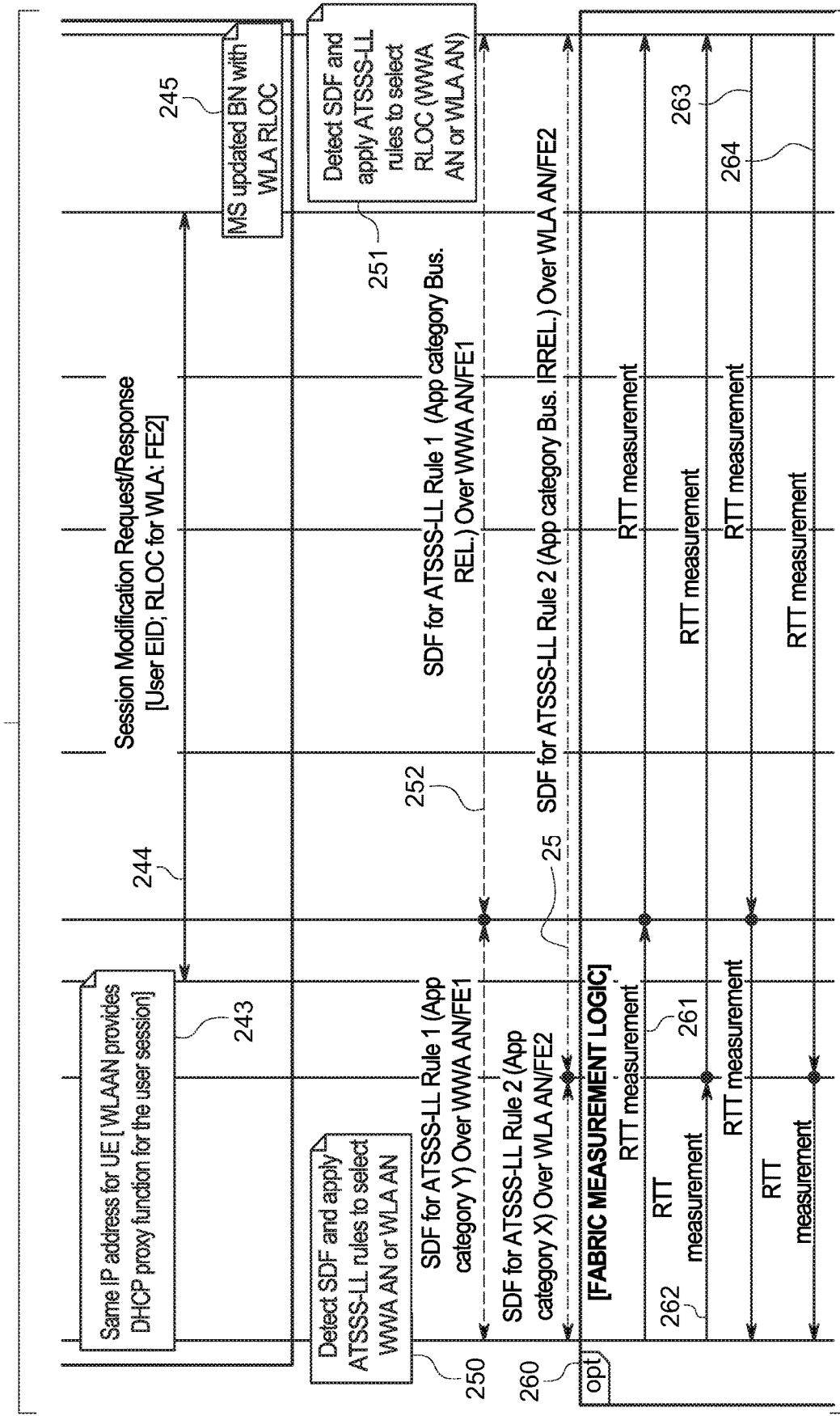

Although not illustrated in FIG. 2C, MS 126 may also update the map-cache of FE2 122(2) with the EID and RLOC information regarding the UE 102 WWA AN connection, for example, to facilitate intra-fabric communications between UE 102 and one or more other UE that may be connected to the WWA AN via WWA AP 112.

Returning to AMF 142 operations, at 232, AMF 142 communicates an N2 PDU session request to WWA AP 112 that includes a NAS message includes the IP address for UE 102, the MA-PDU session ID, the ATSSS-LL rules for UE 102, and FML 125 identifying information (e.g., IP address or FQDN for FML 125). Obtaining the message triggers an exchange between WWA AP 112 and UE 102 for AN specific resources are setup for the MA-PDU session in which the IP address for UE 102, the MA-PDU session ID, the ATSSS-LL rules for UE 102, and FML 125 identifying information (e.g., IP address or FQDN for FML 125) are communicated to the UE 102, as shown at 233. At 234, WWA AP 112 communicates an N2 PDU session response to AMF 142 indicating successful setup of the MA-PDU session for UE 102.

As shown at 250, UE 102 can detect SDFs and apply the ATSSS-LL rules for UL traffic in order to select the WWA AN/WWA AP 112 and/or the WLA AN/WLA AP 114 based on the ATSSS-LL rules for transmitting UL packets to the network. As shown at 251, BN 124 can detect SDFs and apply the ATSSS-LL rules for UE 102 DL traffic in order to select the RLOC associated with WWA AN/WWA AP 112 FE node (e.g., RLOC=FE1) and/or the RLOC associated with the WLA AN/WLA AP 114 FE node (e.g., RLOC=FE2)

based on the ATSSS-LL rules for UE 102 for transmitting DL packets toward UE 102 across SDA fabric 120.

For example, as shown at 252, an SDF for UL/DL traffic associated with ATSSS-LL Rule 1 for business relevant application traffic is detected such that the WWA AN/FE1 is utilized for UL/DL transmissions for UE 102 for the application traffic. In another example, as shown at 253, an SDF for UL/DL traffic associated with ATSSS-LL Rule 2 for business irrelevant application traffic is detected such that WLA AN/FE2 is utilized for UL/DL transmissions for UE 102 for the application traffic.

Consider further measurement operations 260 that may be performed by UE 102 and FML 125 that may be utilized to update/normalize ATSSS-LL rules for UE 102 based on network performance measurements in some embodiments. For example, as shown at 261 round-trip-time (RTT) measurements (e.g., RTT, delay, packet loss, throughput, etc.) may be initiated by UE 102 for the WWA AN via WWA AP 112 and for the WLA AN via WLA AP 114 as shown at 262. FML 125 (not shown), hosted via BN 124 may complete RTT measurements for the WWA AN via WWA AP 112 at 263 and for the WLA AN via WLA AP 114 at 264.

Figure 2D:
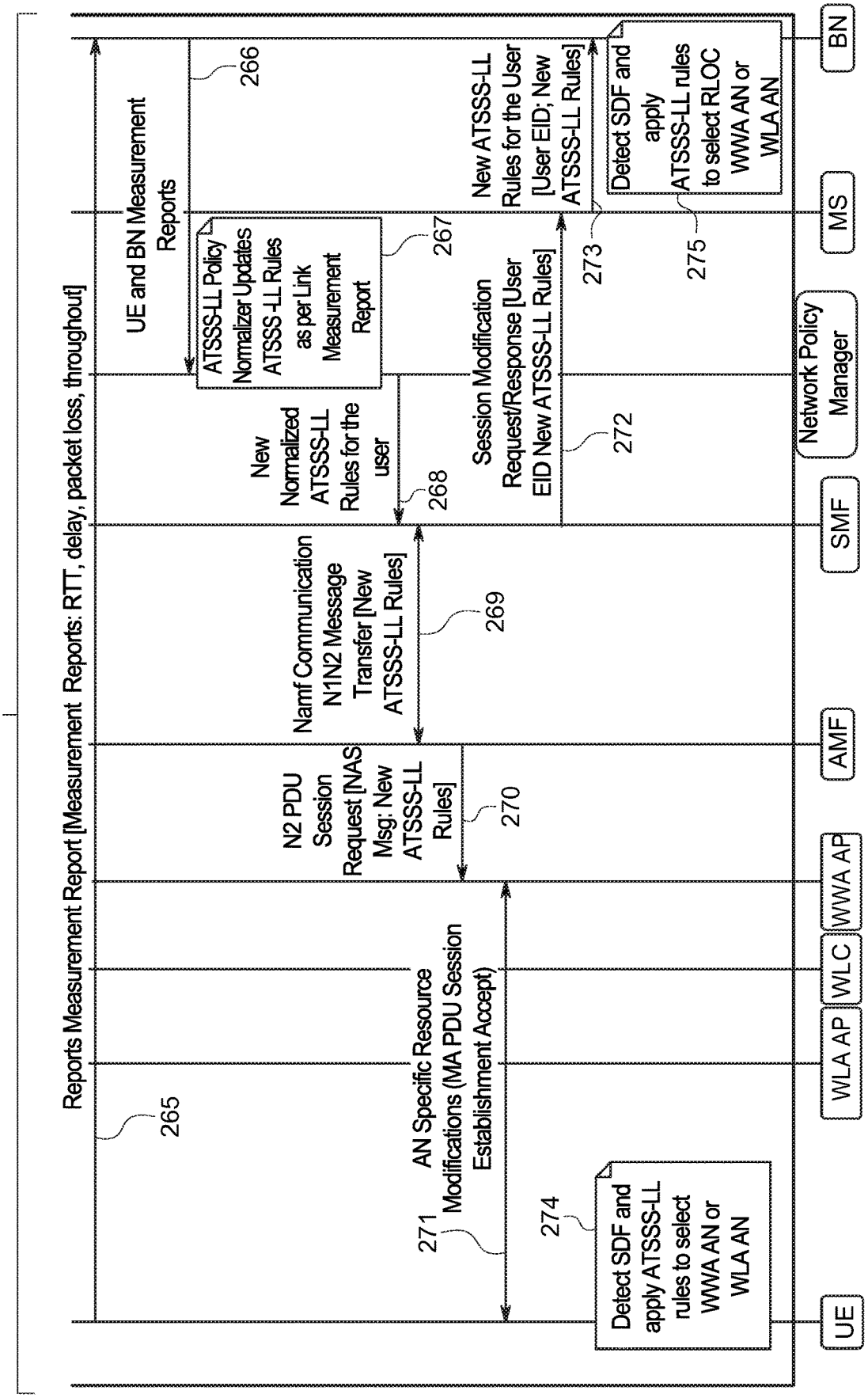

Continuing to FIG. 2D, at 265, UE 102 communicates one or more measurement reports to BN 124/FML 125 including the measurement information from the RTT measurements for each AN (e.g., per-AN link RTT, delay, packet loss, throughput, etc.). At 266, BN 124/FML 125 communicates UE and FML measurement reports to network policy manager 134/ATSSS-LL policy normalizer logic 136. At 267, ATSSS-LL policy normalizer logic updates one or more ATSSS-LL policies/rules based on the per-link measurement reports.

For the present example, consider that the updates affect the ATSSS-LL rules for UE 102. For example, consider that the active link for business relevant traffic may set to the WLA AN and the standby link may be set to WWA AN based on measurement reports indicating better performance for the WLA AN for the UE 102 access network connections. Thus, for the present example at 268, network policy manager 134/ATSSS-LL policy normalizer logic 136 may communicate the updated ATSSS-LL rules for UE 102 to SMF 144, which may trigger sending the updated rules to UE 102, as shown at 269, 270, and 271 via session modification exchanges.

At 272, SMF 144 may also communicate a LISP session modification request/response to MS 126 that includes the UE 102 EID (e.g., IP address '10.10.2.201') and the new ATSSS-LL rules for UE 102, which triggers MS 126 to update EID-to-RLOC mapping information for UE 102. At 273, MS 126 updates the map-cache of BN 124 to include the new ATSSS-LL rules for the UE 102 EID.

Thereafter, as shown at 274, UE 102 can detect SDFs and apply the new ATSSS-LL rules for UL traffic in order to select the WWA AN/WWA AP 112 and/or the WLA AN/WLA AP 114 based on the new ATSSS-LL rules for transmitting UL packets to the network. As shown at 275, BN 124 can detect SDFs and apply the new ATSSS-LL rules for UE 102 DL traffic in order to select the RLOC associated with WWA AN/WWA AP 112 FE node (e.g., RLOC=FE1) and/or the RLOC associated with the WLA AN/WLA AP 114 FE node (e.g., RLOC=FE2) based on the new ATSSS-LL rules for UE 102 for transmitting DL packets toward UE 102 across SDA fabric 120.

Additional operations are shown at 240 for a use case in which the MA-PDU session for UE 102 is established via the WWA AN before a WLA AN session. For such a use case, consider at 241 that UE 102 performs an 802.11 association request/response with WLC 132 via WLA AP 114. In some embodiments, UE 102 may signal its MA-PDU session identifier to WLC 132 during the 802.11 association exchange using a MA-PDU session container. Continuing to FIG. 2C, at 242, WLC 132 performs a query with network policy manager 134/correlation logic 138 (e.g., via operations as discussed at 212, 213, and 214) to determine if a MA-PDU session exists for the UE 102 via the WWA access network.

In at least one embodiment, the operations for WLC 132 may include the WLC including the MA-PDU session identifier for UE 102 in the query sent to network policy manager 134/ATSSS-LL policy normalizer logic 136 such that the request may be characterized as a DHCP proxy request for determining the IP address for the UE 102. Typically, a WLC (e.g., WLC 132) or an WLA AP (e.g., WLA AP114) may include DHCP proxy functionality. For the present example operations, consider that the MA-PDU session does exist for the UE, at which point, network policy manager 134/correlation logic 138 can return the same IP address to WLC 132 for the WLA AN session as is in use for the UE 102 MA-PDU session. Thus, at 243, the same IP address is allocated to the UE 102 for the WLA AN session thereby facilitating a DHCP proxy function for the UE 102 WLA AN session. Thus, the UE 102 may be provided native use of the WLA AN without IPSec.

At 244, WLC 132 further notifies MS 126 regarding the EID for UE 102 (the UE 102 IP address) and the RLOC of the FE node to which WLA AP 114 is connected (e.g., RLOC=FE2, which triggers MS 126 to update EID-to-RLOC mapping information for UE 102. At 245, MS 126 updates the map-cache of BN 124 with the EID and RLOC information regarding the UE 102 WLA AN connection (e.g., RLOC=FE2).

Thus, network policy manager 134, via ATSSS-LL policy normalizer logic 136 and correlation logic 138, in conjunction with WLC 132 and WWA control nodes 140, as well as MS 126 may facilitate ATSSS-LL policy binding for multiple access network paths, which, for a LISP implementation, can be normalized to include RLOC/EID information in order to facilitate appropriate switching/routing across a distributed data plane, such as SDA fabric 120, using LISP forwarding elements, such as BN 124, FE1 122(1), and FE2 122(2), in which the the SDA fabric 120 may provide a common data plane for both WLA and WWA traffic, with network elements, such as a Map-Server, providing mobility support for one or more UE.

Figure 3:
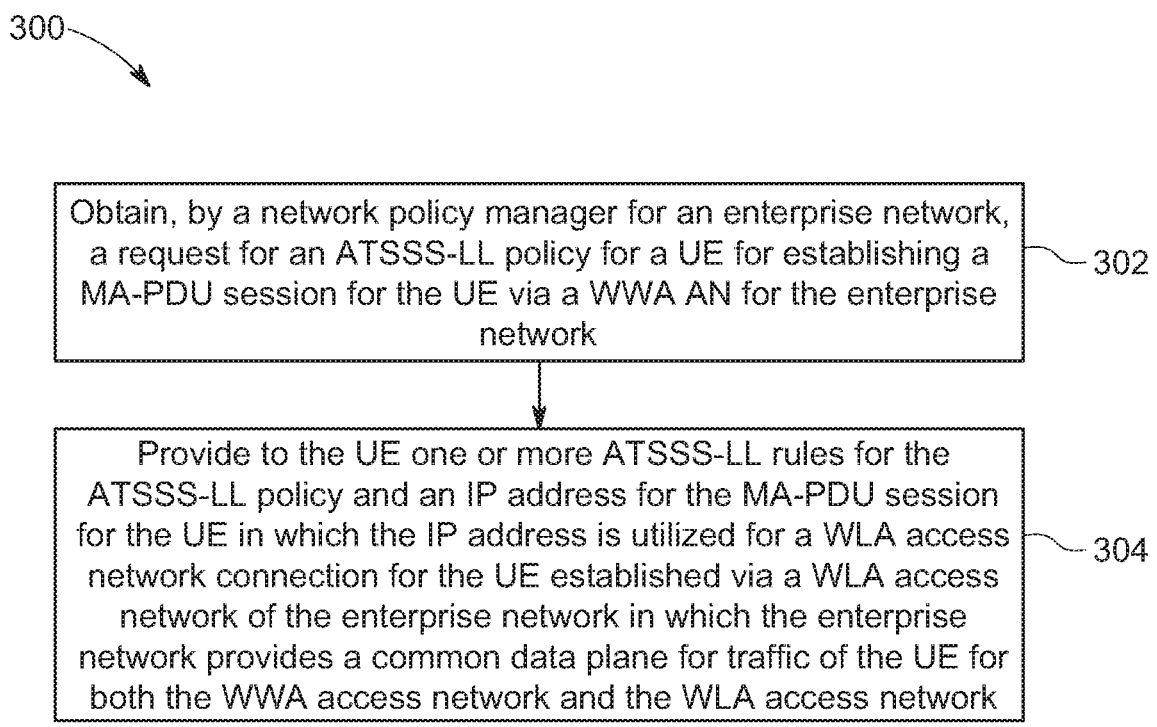
FIG. 3 is a flow chart depicting a method according to an example embodiment.

Referring to FIG. 3, FIG. 3 is a flow chart depicting a method 300 according to an example embodiment. In at least one embodiment, method 300 illustrates example operations that may be performed by network policy manager 134 in order to establish a MA-PDU session for UE 102 in which the same IP address is utilized for the connections to the WWA access network and the WLA access network.

At 302, the method may include obtaining, by a network policy manager for an enterprise network (e.g., network policy manager 134), a request for an ATSSS-LL policy for a UE for establishing a MA-PDU session for the UE via a WWA AN for the enterprise network.

At 304, the method may include providing to the UE one or more ATSSS-LL rules for the ATSSS-LL policy and an IP address for the MA-PDU session for the UE in which the IP address is utilized for a WLA access network connection for the UE established via a WLA access network of the enterprise network in which the enterprise network provides a common data plane for traffic of the UE for both the WWA access network and the WLA access network.

Recall, as discussed herein that other operations may be performed for establishing an MA-PDU session for a given UE. For example, the method may further include obtaining, by a map server of the enterprise network (e.g., MS 126), the one or more ATSSS-LL rules for the UE and a first RLOC for a first node providing interconnection with the WWA access network for the enterprise network (e.g., RLOC=FE1). The method may further include obtaining, by the map server, a second RLOC for a second node providing interconnection with the WLA access network for the enterprise network (e.g., RLOC=FE2) and providing by the map server to a third node for the enterprise network (e.g., BN 124), the IP address of the UE, the one or more ATSSS-LL rules, the first RLOC, and the second RLOC.

In some instances, the method may further include identifying, by the third node, a SDF for DL traffic of the UE that is associated with a particular ATSSS-LL rule and routing traffic to the UE utilizing at least one of the WWA access network and the WLA access network based on the particular ATSSS-LL rule. Other operations can be performed as discussed herein.

Figure 4:
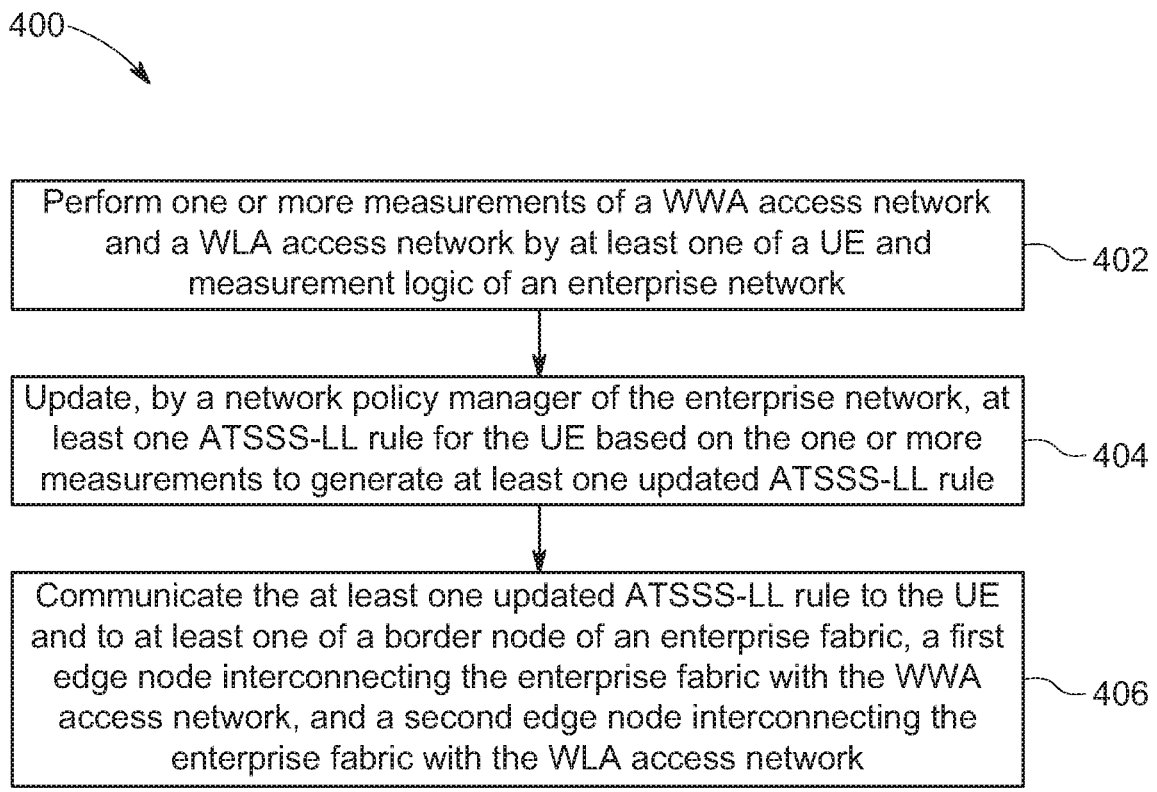
FIG. 4 is another flow chart depicting another method according to an example embodiment.

Referring to FIG. 4, FIG. 4 is another flow chart depicting another method 400 according to an example embodiment. In at least one embodiment, method 400 illustrates example operations that may be performed via FML 125, UE 102, and ATSSS-LL policy normalizer logic 136 in order to update one or more ATSSS-LL rules for enterprise network.

At 402, the method may include performing one or more measurements of a WWA access network and a WLA access network by at least one of a UE (e.g., UE 102) and measurement logic (e.g., FML 125) of an enterprise network. In various embodiments, the measurements may include RTT measurements, packet delay measurements, packet loss measurements, throughput measurements and/or the like performed for each access network.

At 404, the method may include updating, by a network policy manager of the enterprise network, at least one ATSSS-LL rule for the UE based on the one or more measurements to generate at least one updated ATSSS-LL rule. For example, in some instances, the updating may include switching the primary/active access network and the secondary/standby access network that are to be utilized for UL/DL communications for one or more SDFs (application traffic) that may be associated with a particular ATSSS-LL rule.

At 406, the method may include communicating the at least one updated ATSSS-LL rule to the UE and to at least one of a border node of an enterprise fabric (e.g., BN 124 of SDA fabric 120), a first edge node interconnecting the enterprise fabric with the WWA access network (e.g., FE1 122(1)), and a second edge node interconnecting the enterprise fabric with the WLA access network (e.g., FE2 122 (2)).

Figure 5:
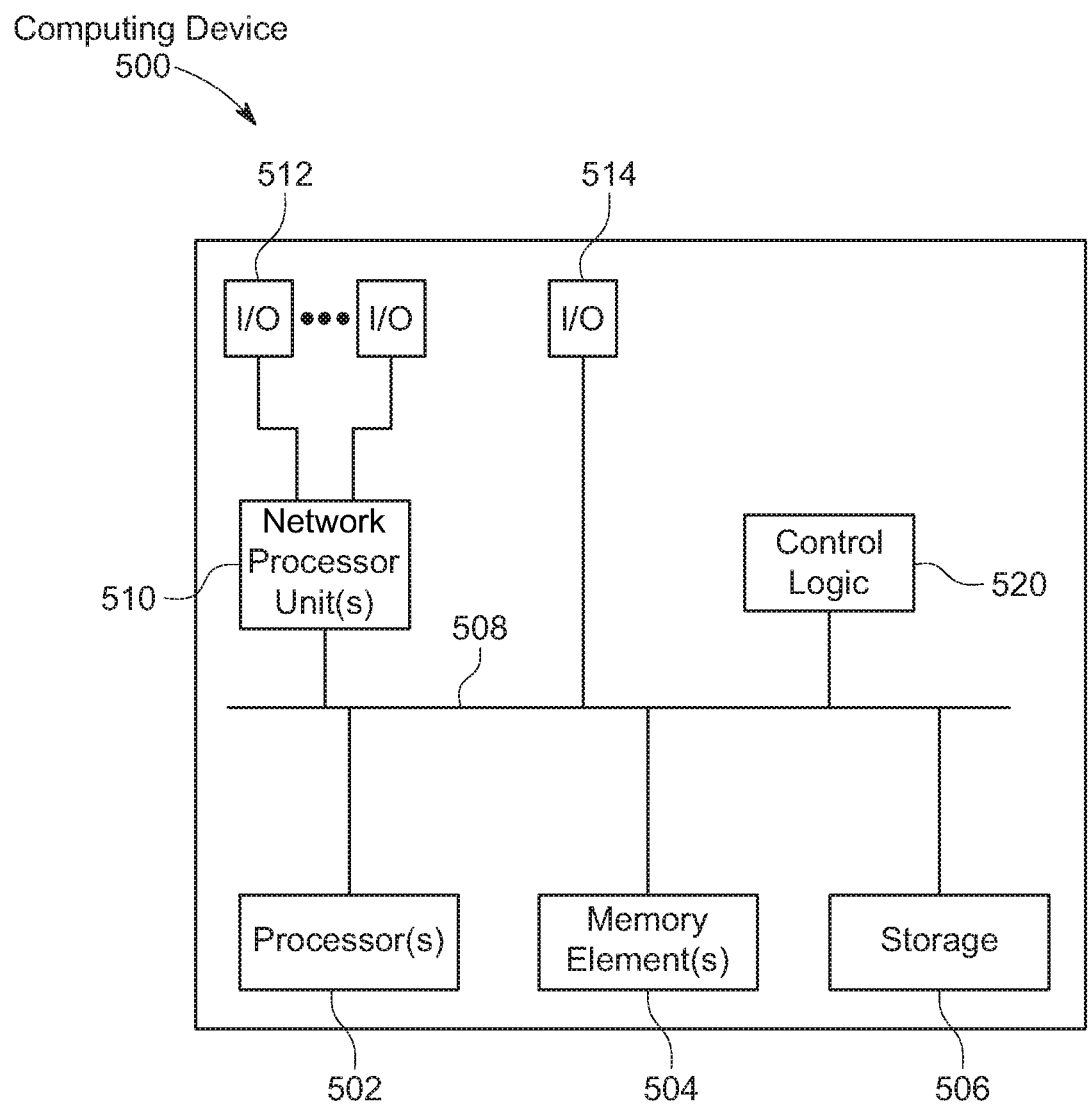
FIG. 5 is a hardware block diagram of a computing device that may perform functions associated with any combination of operations, in connection with the techniques discussed herein.

Referring to FIG. 5, FIG. 5 illustrates a hardware block diagram of a computing device 500 that may perform functions associated with operations discussed herein in connection with the techniques depicted in FIGS. 1-4. In various embodiments, a computing device, such as computing device 500 or any combination of computing devices 500, may be configured as any entity/entities as discussed for the techniques depicted in connection with FIGS. 1-4 in order to perform operations of the various techniques discussed herein.

In at least one embodiment, computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device. Processor(s) 502 (e.g., hardware processor(s)) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computer device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, if computing device 500 is implemented as a network policy manager (e.g., network policy manager 134 of FIG. 1), control logic 540 may be configured as ATSSS-LL policy normalizer logic (e.g., ATSSS-LL policy normalizer logic 136) and correlation logic (e.g., correlation logic 138) such that when the processor(s) 514 execute control logic 540, the processor(s) 514 are caused to perform operations including, but not limited to, obtaining a request for an ATSSS-LL policy for a UE for establishing a multiple access protocol data unit session for the UE via a wireless wide area access network for an enterprise network and providing to the UE one or more ATSSS-LL rules for the ATSSS-LL policy and an IP address for the multiple access protocol data unit session for the UE in which the IP address is utilized for a wireless local area access network session for the UE established via a wireless local area access network of the enterprise network.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining a request for an Access Traffic Steering, Switching, and Splitting Low-Layer (ATSSS-LL) policy for a user equipment (UE) for establishing a multiple access protocol data unit session for the UE via a wireless wide area access network for an enterprise network; and providing to the UE one or more ATSSS-LL rules for the ATSSS-LL policy and an Internet Protocol (IP) address for the multiple access protocol data unit session for the UE, wherein the IP address is utilized for a wireless local area access network connection for the UE established via a wireless local area access network of the enterprise network in which the enterprise network provides a common data plane for traffic of the UE for both the wireless wide area access network and the wireless local area access network. In some instances, the method may further include obtaining, by a map server of the enterprise network, the one or more ATSSS-LL rules and a first Routing Locator (RLOC) for a first node providing interconnection with the wireless wide area access network for the enterprise network; obtaining, by the map server, a second RLOC for a second node providing interconnection with the wireless local area access network for the enterprise network; and providing to a third node for the enterprise network, the IP address of the UE, the one or more ATSSS-LL rules, the first RLOC, and the second RLOC, wherein the third node provides interconnection with one or more external networks.

In some instances, the method may further include identifying, by the third node, a service data flow for traffic of the UE that is associated with a particular ATSSS-LL rule; and routing traffic to the UE utilizing at least one of the wireless wide area access network and the wireless local area access network based on the particular ATSSS-LL rule.

In some instances, the method may further include providing the first RLOC to the second node; and providing the second RLOC to the first node. In some instances, the method may further include providing a multiple access protocol data unit session identifier to the UE.

In some instances, when the multiple access protocol data unit session for the UE is established via the wireless wide area access network before the wireless local area access network connection is established for the UE, the method may further include obtaining a dynamic host configuration protocol (DHCP) proxy request for the UE that includes a multiple access protocol data unit session identifier for the UE; and providing the IP address to the UE for establishing the wireless local area access network connection for the wireless local area access network.

In some instances, the method may further include providing to the UE an IP address or a Fully Qualified Domain Name (FQDN) for measurement logic within the enterprise network. The measurement logic may configured for one or more of a first node providing interconnection with the wireless wide area access network for the enterprise network; a second node providing interconnection with the wireless local area access network for the enterprise network; and a third node providing interconnection with one or more external data networks for the enterprise network.

In some instance, the method may further include performing one or more measurements of the enterprise network, the wireless wide area access network, and the wireless local area access network by at least one of the UE and the measurement logic; updating at least one ATSSS-LL rule based on the one or more measurements to generate at least one updated ATSSS-LL rule; and communicating the at least one updated ATSSS-LL rule to the UE and the third node.

In various instances, the wireless wide area access network is at least one of a Citizens Broadband Radio Service (CBRS) access network; a Third Generation Partnership Project (3GPP) Fifth Generation (5G) access network; and a Third Generation Partnership Project (3GPP) next Generation (nG) access network.

In summary, provided herein are techniques that may facilitate establishing a MA-PDU Session over a WWA AN, such as a 5G/nG-AN, and correlating this MA-PDU session with a WLA AN session, such as a Wi-Fi session originated via non-3GPP signaling without utilizing an overlay IPsec tunnel. As a result ATSSS-LL rules can be applied for each UE/EID utilizing access specific RLOCs in an enterprise SDA fabric over a distributed data plane in which the SDA fabric may provide a common data plane for both WLA and WWA traffic, with network elements, such as a Map-Server, providing mobility support for one or more UE. The enterprise's distributed data plane (e.g. Border Node, etc.) may identify SDFs (traffic flows) and apply ATSSS-LL rules on the flows in order to send traffic to the RLOC servicing a selected access network (e.g., 5G-AN and/or Wi-Fi) and/or to indicate the access type in a VxLAN header encapsulating packets of the flows. Additionally, techniques herein may provide for the ability to configure fabric measurement logic (e.g., FML 125) for one or more fabric nodes (e.g. a first hop switch such as FE1 and/or FE2; a WWA AP, such as a 5G gNodeB; a WLA AP, such as a Wi-Fi AP; and/or a border node BN, such as BN 124) for performing one or more access network measurements (e.g., RTT, etc.) in order to update/normalize one or more ATSSS-LL policies for an enterprise network.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining a request for one or more Access Traffic Steering, Switching, and Splitting Low-Layer (ATSSS-LL) rules for a user equipment (UE) for establishing a multiple access protocol data unit session for the UE via a wireless wide area access network for an enterprise network;
    providing to the UE the one or more ATSSS-LL rules and an Internet Protocol (IP) address for the multiple access protocol data unit session for the UE, wherein the IP address is utilized for a wireless local area access network connection for the UE established via a wireless local area access network of the enterprise network in which the enterprise network provides a common data plane for traffic of the UE for both the wireless wide area access network and the wireless local area access network;
    obtaining, by a map server of the enterprise network, the one or more ATSSS-LL rules and a first Routing Locator (RLOC) for a first node providing interconnection with the wireless wide area access network for the enterprise network;
    obtaining, by the map server, a second RLOC for a second node providing interconnection with the wireless local area access network for the enterprise network; and
    providing to a third node for the enterprise network, the IP address of the UE, the one or more ATSSS-LL rules, the first RLOC, and the second RLOC, wherein the third node provides interconnection with one or more external networks.

2. The method of claim 1, further comprising:
    identifying, by the third node, a service data flow for traffic of the UE that is associated with a particular ATSSS-LL rule; and
    routing traffic to the UE utilizing at least one of the wireless wide area access network and the wireless local area access network based on the particular ATSSS-LL rule.

3. The method of claim 1, further comprising:
    providing the first RLOC to the second node; and
    providing the second RLOC to the first node.

4. The method of claim 1, further comprising:
    providing a multiple access protocol data unit session identifier to the UE.

5. The method of claim 1, wherein when the multiple access protocol data unit session for the UE is established via the wireless wide area access network before the wireless local area access network connection is established for the UE, the method further comprising:
    obtaining a dynamic host configuration protocol (DHCP) proxy request for the UE that includes a multiple access protocol data unit session identifier for the UE; and providing the IP address to the UE for establishing the wireless local area access network connection for the wireless local area access network.

6. The method of claim 1, further comprising:
providing to the UE an IP address or a Fully Qualified Domain Name (FQDN) for measurement logic within the enterprise network.

7. The method of claim 6, wherein the measurement logic is configured for one or more of:
the first node providing interconnection with the wireless wide area access network for the enterprise network;
the second node providing interconnection with the wireless local area access network for the enterprise network; and
the third node providing interconnection with the one or more external networks.

8. The method of claim 7, further comprising:
performing one or more measurements of the enterprise network, the wireless wide area access network, and the wireless local area access network by at least one of the UE and the measurement logic;
updating at least one ATSSS-LL rule based on the one or more measurements to generate at least one updated ATSSS-LL rule; and
communicating the at least one updated ATSSS-LL rule to the UE and the third node.

9. The method of claim 1, wherein the wireless wide area access network is at least one of:
a Citizens Broadband Radio Service (CBRS) access network;
a Third Generation Partnership Project (3GPP) Fifth Generation (5G) access network; and
a Third Generation Partnership Project (3GPP) next Generation (nG) access network.

10. One or more non-transitory computer readable storage media encoded with instructions that, when executed by a processor, cause the processor to perform operations, comprising:
obtaining a request for one or more Access Traffic Steering, Switching, and Splitting Low-Layer (ATSSS-LL) rules for a user equipment (UE) for establishing a multiple access protocol data unit session for the UE via a wireless wide area access network for an enterprise network; and
providing to the UE the one or more ATSSS-LL rules and an Internet Protocol (IP) address for the multiple access protocol data unit session for the UE, wherein the IP address is utilized for a wireless local area access network connection for the UE established via a wireless local area access network of the enterprise network in which the enterprise network provides a common data plane for traffic of the UE for both the wireless wide area access network and the wireless local area access network;
obtaining, by a map server of the enterprise network, the one or more ATSSS-LL rules and a first Routing Locator (RLOC) for a first node providing interconnection with the wireless wide area access network for the enterprise network;
obtaining, by the map server, a second RLOC for a second node providing interconnection with the wireless local area access network for the enterprise network; and
providing to a third node for the enterprise network, the IP address of the UE, the one or more ATSSS-LL rules, the first RLOC, and the second RLOC, wherein the third node provides interconnection with one or more external networks.

11. The media of claim 10, further comprising instructions that, when executed by the processor, cause the processor to perform operations, comprising:
providing a multiple access protocol data unit session identifier to the UE.

12. The media of claim 10, further comprising instructions that, when executed by the processor, cause the processor to perform operations, comprising:
providing to the UE an IP address or a Fully Qualified Domain Name (FQDN) for measurement logic within the enterprise network.

13. A system comprising:
at least one memory element for storing data; and
at least one processor for executing instructions associated with the data, wherein executing the instructions causes the system to perform operations, comprising:
obtaining a request for one or more Access Traffic Steering, Switching, and Splitting Low-Layer (ATSSS-LL) rules for a user equipment (UE) for establishing a multiple access protocol data unit session for the UE via a wireless wide area access network for an enterprise network; and
providing to the UE the one or more ATSSS-LL rules and an Internet Protocol (IP) address for the multiple access protocol data unit session for the UE, wherein the IP address is utilized for a wireless local area access network connection for the UE established via a wireless local area access network of the enterprise network in which the enterprise network provides a common data plane for traffic of the UE for both the wireless wide area access network and the wireless local area access network;
obtaining, by a map server of the enterprise network, the one or more ATSSS-LL rules and a first Routing Locator (RLOC) for a first node providing interconnection with the wireless wide area access network for the enterprise network;
obtaining, by the map server, a second RLOC for a second node providing interconnection with the wireless local area access network for the enterprise network; and
providing to a third node for the enterprise network, the IP address of the UE, the one or more ATSSS-LL rules, the first RLOC, and the second RLOC, wherein the third node provides interconnection with one or more external networks.

14. The system of claim 13, wherein executing the instructions causes the system to perform further operations, comprising:
providing a multiple access protocol data unit session identifier to the UE.

15. The system of claim 13, wherein executing the instructions causes the system to perform further operations, comprising:
providing to the UE an IP address or a Fully Qualified Domain Name (FQDN) for measurement logic within the enterprise network, wherein the measurement logic is configured for one or more of:
the first node providing interconnection with the wireless wide area access network for the enterprise network;
the second node providing interconnection with the wireless local area access network for the enterprise network; and
the third node providing interconnection with the one or more external networks.

16. The system of claim 15, wherein executing the instructions causes the system to perform further operations, comprising:

performing one or more measurements of the enterprise network, the wireless wide area access network, and the wireless local area access network by at least one of the UE and the measurement logic;

updating at least one ATSSS-LL rule based on the one or more measurements to generate at least one updated ATSSS-LL rule; and communicating the at least one updated ATSSS-LL rule to the UE and the third node.

17. The system of claim 13, wherein the wireless wide area access network is at least one of:

a Citizens Broadband Radio Service (CBRS) access network;

a Third Generation Partnership Project (3GPP) Fifth Generation (5G) access network; and a Third Generation Partnership Project (3GPP) next Generation (nG) access network.

18. The system of claim 13, wherein executing the instructions causes the system to perform further operations, comprising:

identifying, by the third node, a service data flow for traffic of the UE that is associated with a particular ATSSS-LL rule; and routing traffic to the UE utilizing at least one of the wireless wide area access network and the wireless local area access network based on the particular ATSSS-LL rule.

19. The system of claim 13, wherein executing the instructions causes the system to perform further operations, comprising:

providing the first RLOC to the second node; and providing the second RLOC to the first node.

20. The system of claim 13, wherein when the multiple access protocol data unit session for the UE is established via the wireless wide area access network before the wireless local area access network connection is established for the UE, executing the instructions causes the system to perform further operations, comprising:

obtaining a dynamic host configuration protocol (DHCP) proxy request for the UE that includes a multiple access protocol data unit session identifier for the UE; and providing the IP address to the UE for establishing the wireless local area access network connection for the wireless local area access network.

\* \* \* \* \*